United States Patent
Higuchi

(10) Patent No.: US 11,248,714 B2
(45) Date of Patent: Feb. 15, 2022

(54) THROTTLE VALVE DEVICE

(71) Applicant: DENSO CORPORATION, Kariya (JP)

(72) Inventor: Akira Higuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 231 days.

(21) Appl. No.: 16/733,402

(22) Filed: Jan. 3, 2020

(65) Prior Publication Data

US 2020/0141511 A1   May 7, 2020

Related U.S. Application Data

(63) Continuation of application No. PCT/JP2018/024094, filed on Jun. 26, 2018.

(30) Foreign Application Priority Data

Jul. 7, 2017  (JP) .............................. JP2017-133974

(51) Int. Cl.
| | | |
|---|---|---|
| *F16K 31/04* | (2006.01) | |
| *F02D 9/02* | (2006.01) | |
| *F16F 1/14* | (2006.01) | |
| *F16K 11/052* | (2006.01) | |
| *F16K 1/22* | (2006.01) | |

(Continued)

(52) U.S. Cl.
CPC .............. *F16K 31/043* (2013.01); *F02D 9/02* (2013.01); *F02D 9/1065* (2013.01); *F16F 1/06* (2013.01); *F16F 1/12* (2013.01); *F16F 1/14* (2013.01); *F16K 1/221* (2013.01); *F16K 11/0525* (2013.01); *F16K 31/042* (2013.01); *F02D 2009/0205* (2013.01); *F02D 2009/0218* (2013.01); *F02D 2009/0269* (2013.01)

(58) Field of Classification Search
CPC .... F16K 31/043; F16K 1/221; F16K 11/0525; F16K 31/042; F16F 1/06; F16F 1/12; F16F 1/14; F02D 9/1065; F02D 9/02; F02D 2009/0269; F02D 2009/0218; F02D 2009/0205
USPC ......................... 251/129.11–129.13, 305–308
See application file for complete search history.

(56) References Cited

U.S. PATENT DOCUMENTS

| | | | | |
|---|---|---|---|---|
| 4,880,207 A | * | 11/1989 | Matsumoto | ........... F02D 9/1065 |
| | | | | 251/337 |
| 5,509,396 A | * | 4/1996 | Tamaki | ..................... F02D 9/02 |
| | | | | 123/400 |

(Continued)

FOREIGN PATENT DOCUMENTS

| | | |
|---|---|---|
| JP | 2016-166572 | 9/2016 |
| WO | 2019/009134 | 1/2019 |

*Primary Examiner* — John Bastianelli
(74) *Attorney, Agent, or Firm* — Nixon & Vanderhye P.C.

(57) ABSTRACT

When a rotating body is oriented at a default position due to the absence of a driving force, a first hook portion and a second hook portion are engaged with a fixed engagement portion and/or a movable engagement portion. When the rotating body is rotated from the default position by the driving force, the first hook portion is engaged with one of the fixed engagement portion and the movable engagement portion, and the second hook portion is engaged with the other of the fixed engagement portion and the movable engagement portion. A throttle valve device includes a pressing portion that presses the first hook portion and/or the second hook portion to apply a pressing force toward a center of a coil portion in a coil axial direction.

9 Claims, 18 Drawing Sheets

(51) Int. Cl.
*F02D 9/10* (2006.01)
*F16F 1/06* (2006.01)
*F16F 1/12* (2006.01)

(56) References Cited

U.S. PATENT DOCUMENTS

| | | | | |
|---|---|---|---|---|
| 6,863,259 | B2 * | 3/2005 | Torii | F02D 11/10 |
| | | | | 251/305 |
| 6,966,297 | B2 * | 11/2005 | Wayama | F02D 9/00 |
| | | | | 123/399 |
| 7,302,931 | B2 * | 12/2007 | Saito | F02D 9/1065 |
| | | | | 123/396 |
| 7,503,309 | B2 * | 3/2009 | Tanimura | F02D 41/107 |
| | | | | 123/396 |
| 2004/0129252 | A1 | 7/2004 | Wayama et al. | |
| 2004/0173184 | A1 * | 9/2004 | Tanimura | F16F 1/12 |
| | | | | 123/399 |
| 2018/0238409 | A1 * | 8/2018 | Higuchi | F16F 1/025 |

\* cited by examiner

THROTTLE VALVE DEVICE

CROSS REFERENCE TO RELATED APPLICATION

The present application is a continuation application of International Patent Application No. PCT/JP2018/024094 filed on Jun. 26, 2018, which designated the U.S. and claims the benefit of priority from Japanese Patent Application No. 2017-133974 filed on Jul. 7, 2017. The entire disclosures of all of the above applications are incorporated herein by reference.

TECHNICAL FIELD

The present disclosure relates to a throttle valve device.

BACKGROUND ART

A throttle valve device is widely known, in which an opening degree of a fluid passage formed in a valve body is increased or decreased by a throttle valve body.

SUMMARY

According to one aspect of the present disclosure, a throttle valve device includes: a valve body having a fixed engagement portion and forming a fluid passage; a throttle valve configured to increase or decrease an opening degree of the fluid passage; a rotating body having a movable engagement portion and integrally rotating with the throttle valve; a torsion coil spring having a coil portion between a first hook portion and a second hook portion; and a guide body that guides the coil portion from the radially inner side. When the rotating body is located at a default position due to a disappearance of a driving force, the first hook portion and the second hook portion are respectively engaged with at least one of the fixed engagement portion and the movable engagement portion. When the rotating body is rotated from the default position by the driving force, the first hook portion and the second hook portion are respectively engaged with the fixed engagement portion and the movable engagement portion. The throttle valve device has a pressing portion configured to press against at least one of the first hook portion and the second hook portion to apply a pressing force toward a center of the coil portion in a coil axial direction.

BRIEF DESCRIPTION OF DRAWINGS

The above and other objects, features and advantages of the present disclosure will become more apparent from the following detailed description made with reference to the accompanying drawings.

EMBODIMENTS

Figure 1:
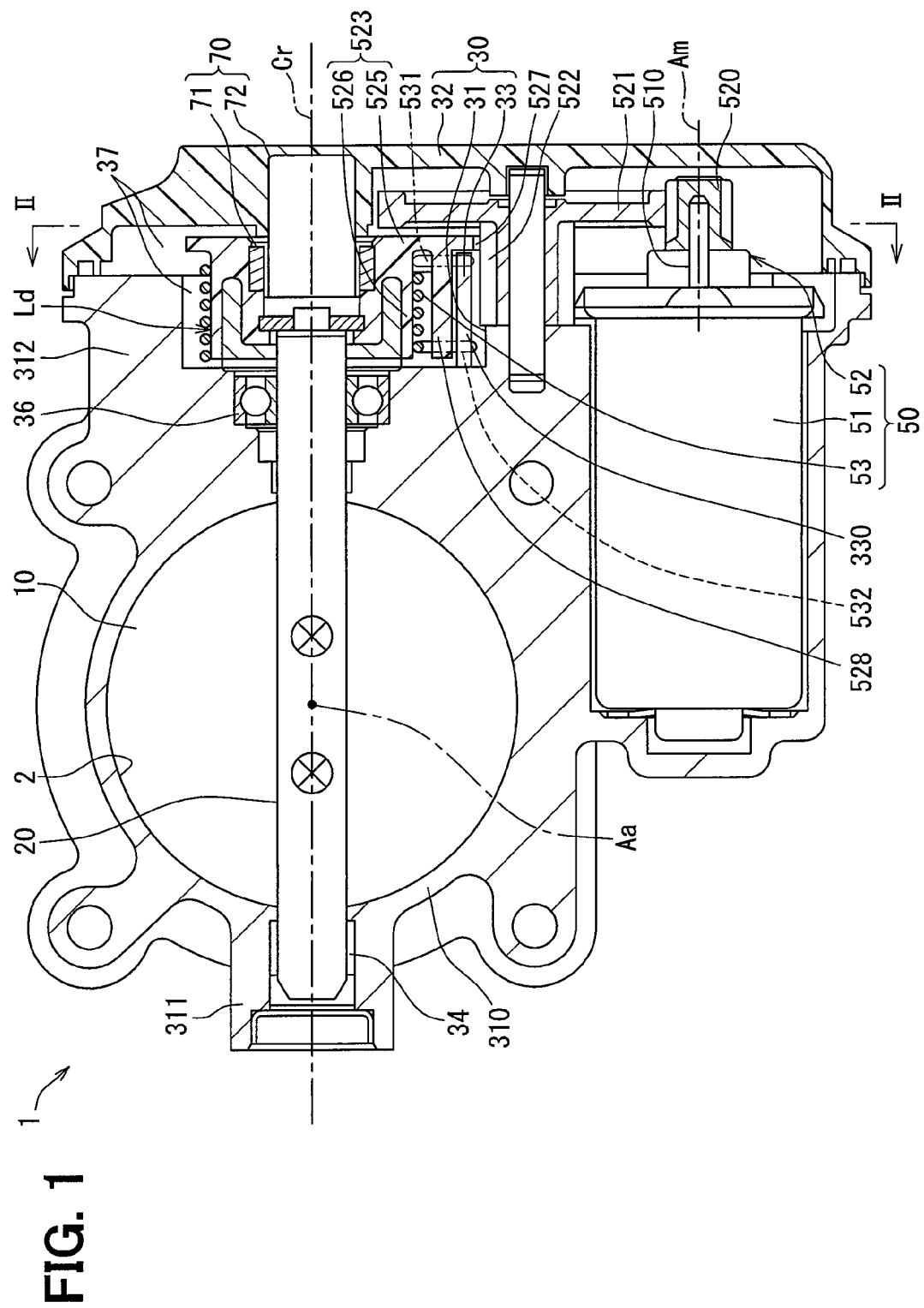
FIG. 1 is a cross-sectional view illustrating a throttle valve device according to a first embodiment.

To begin with, examples of relevant techniques will be described.

Conventionally, a throttle valve device is widely known, in which an opening degree of a fluid passage formed in a valve body is increased or decreased by a throttle valve body. For example, in a throttle valve device, a default spring as a torsion coil spring biases a rotary body that integrally rotates with the throttle valve body when a driving force is generated. As a result, when the driving force is lost, the rotary body can be positioned at a default position together with the throttle valve body.

The default spring of the throttle valve device has a coil portion between a first hook portion and a second hook portion, and a radially inner side of the coil portion is guided by a guide body. When the rotary body is rotated from the default position due to the generation of the driving force, the first hook portion and the second hook portion of the default spring are respectively engaged with a fixed engagement portion of the valve body and a movable engagement portion of the rotary body. When the rotating body is positioned at the default position due to the loss of the driving force, the first hook portion and the second hook portion of the default spring are engaged with at least the movable engagement portion.

In this type of torsion coil spring, the coil portion is inclined when both of the hook portions receive reaction force from the engagement portion. Therefore, the coil portion is pressed against the guide body, and the guide body is abraded. With regard to this issue, the inclined posture of the coil portion can be corrected by pressing the first turn of the coil portion by the peripheral support portion from the outer peripheral side to reduce the wear.

However, when the inventor examined the device, actually, even if the coil portion is pushed in a direction perpendicular to the coil axial direction, the posture cannot be corrected, and it is necessary to push the coil portion at an optimal angle according to the spiral angle of the torsion coil spring. It is extremely difficult to provide a structure with which it is possible to press at the optimum angle with high accuracy. It is found that the orientation of the coil portion is rather deteriorated when pushing in the direction deviated from the optimum angle.

In the above-described structure in which the coil portion is pushed from the outer peripheral side, it is actually difficult to correct the posture when correcting the posture of the coil portion caused by the reaction force applied to both of the hook portions.

The present disclosure provides a throttle valve device in which a posture of a coil portion can be easily corrected.

In order to achieve the above object, according to one aspect of the present disclosure, a throttle valve device includes: a valve body having a fixed engagement portion and forming a fluid passage; a throttle valve configured to increase or decrease an opening degree of the fluid passage; a rotating body having a movable engagement portion and integrally rotating with the throttle valve; a torsion coil spring having a coil portion between a first hook portion and a second hook portion; and a guide body that guides the coil portion from the radially inner side.

When the rotating body is located at a default position due to a disappearance of a driving force, the first hook portion and the second hook portion are respectively engaged with at least one of the fixed engagement portion and the movable engagement portion.

When the rotating body is rotated from the default position by the driving force, the first hook portion and the second hook portion are respectively engaged with the fixed engagement portion and the movable engagement portion.

The throttle valve device has a pressing portion configured to press against at least one of the first hook portion and the second hook portion to apply a pressing force toward a center of the coil portion in a coil axial direction.

The inventor found out that "the posture of the coil portion can be corrected regardless of the helical angle of the torsion coil spring by pressing at least one of the first hook portion and the second hook portion toward the center in the coil axial direction." Accordingly, the throttle valve device is provided with the pressing portion that presses against at least one of the first hook portion and the second hook portion and applies a pressing force toward the center in the coil axial direction. Thus, the posture of the coil portion can be corrected. Moreover, in the conventional structure in which the coil portion is pushed from the outer peripheral side, it is required to push the coil portion at an optimum angle with high precision. In the present application, it is not necessary to make the direction for applying the pressing force accurate. The posture correction of the coil portion can be easily realized.

Hereinafter, embodiments will be described with reference to the drawings. Incidentally, the same reference numerals are assigned to the corresponding components in each embodiment, and thus, duplicate descriptions may be omitted. In a case where only a part of a structure is described in each of the following embodiments, the rest of the structure of the embodiment may be the same as that of previously described one or more of the embodiments. In addition to the combinations of configurations as indicated in the description of various embodiments, the configurations of various embodiments can be partly combined even if not explicitly suggested, unless such combinations are contradictory.

First Embodiment

As shown in FIG. 1, a throttle valve device 1 according to the first embodiment is applied to an electric throttle device mounted on an internal combustion engine of a vehicle. The throttle valve device 1 opens and closes a fluid passage 2 which is a part of an intake passage for the internal combustion engine. Intake air is drawn into the internal combustion engine as a fluid through the fluid passage 2. The throttle valve device 1 adjusts the flow rate of intake air flowing through the fluid passage 2. The throttle valve device 1 includes a throttle body 10, a valve shaft 20, a valve body 30, a drive unit 50, and a sensor unit 70.

The throttle body 10 is a butterfly type rotary valve. The throttle body 10 is formed in a disk shape by metal. The throttle body 10 has a rotation axis Cr substantially perpendicular to a passage axis Aa of the fluid passage 2. The throttle body 10 is housed in the fluid passage 2 to be rotatable on both sides around the rotation axis Cr. The throttle body 10 adjusts the flow rate of intake air in the fluid passage 2 by increasing or decreasing the degree of opening of the fluid passage 2 by rotation around the rotation axis Cr.

The valve shaft 20 is a shaft for rotationally driving the throttle body 10. The valve shaft 20 is formed of metal in an elongated round bar shape. The valve shaft 20 is disposed to cross the fluid passage 2 and to extend along the rotation axis Cr of the throttle body 10. The valve shaft 20 is fastened to the throttle body 10 so as to be integrally rotatable.

The valve body 30 is a fixed node fixed to an intake pipe forming the intake passage for the internal combustion engine. The valve body 30 includes a body part 31, a body cover 32 and a body hook 33. The body part 31 is formed in a block shape of metal. The body part 31 has a bore portion 310 and a housing portion 311, 312. The fluid passage 2 penetrates through the bore portion 310 in a cylindrical hole shape that can be opened and closed by the throttle body 10 having the disc shape. The housing portions 311 and 312 are respectively provided in a hollow shape on both sides of the bore portion 310 on the rotation axis Cr.

A radial sliding bearing 34 is housed and fixed in the first housing portion 311. The radial sliding bearing 34 radially supports the outer peripheral surface of one end of the valve shaft 20. A radial rolling bearing 36 is housed and fixed in the second housing portion 312. The radial rolling bearing 36 radially supports the outer peripheral surface of an intermediate portion of the valve shaft 20 between the end portions.

The body cover 32 is formed of resin in a flat plate shape. The body cover 32 covers the second housing portion 312 by being fastened to the body part 31. The drive unit 50 and the sensor unit 70 are housed and disposed in the main housing space 37 in which the body cover 32 is formed jointly with the second housing portion 312.

Figure 2:
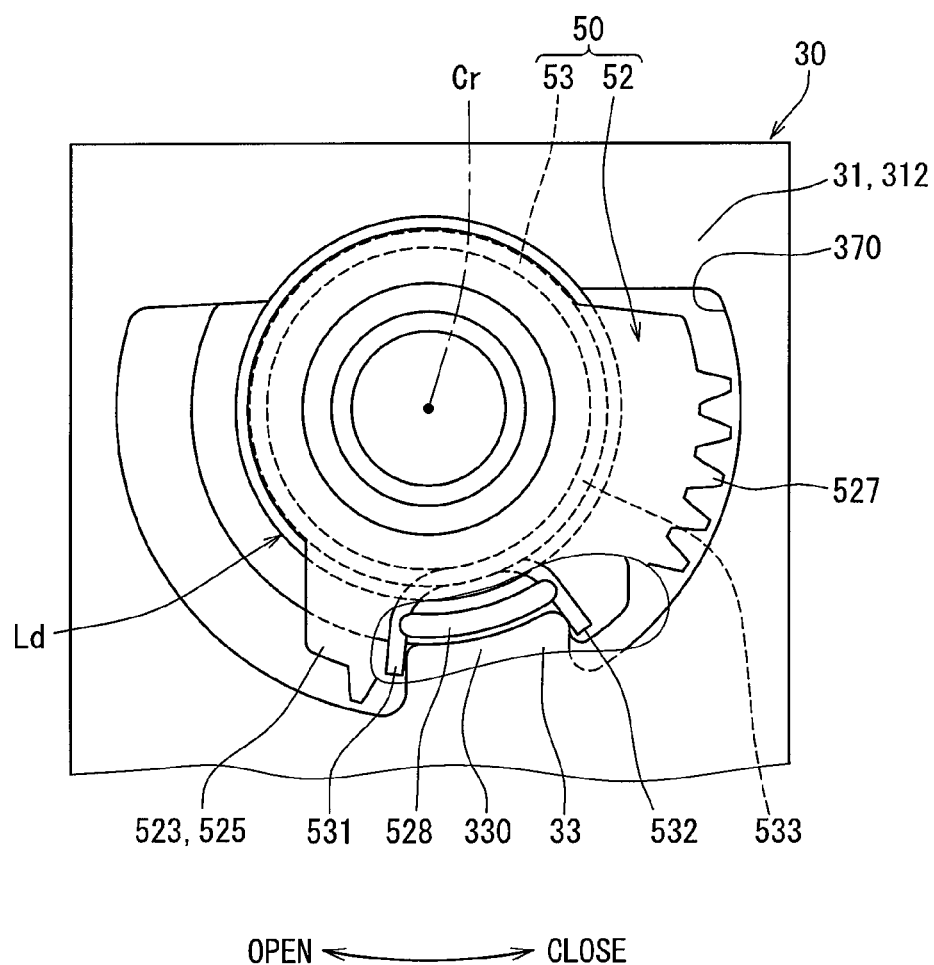
FIG. 2 is a cross-sectional view taken along a line II-II in FIG. 1 and illustrating one operating state of the throttle valve device according to the first embodiment.

As shown in FIGS. 1 and 2, the body hook 33 is formed in a bent shape by metal. The body hook 33 is provided in the second housing portion 312 and thus protrudes into the main housing space 37. The body hook 33 has a fixed engagement portion 330 protruding into the main housing space 37. The fixed engagement portion 330 is formed in a substantially arc piece shape that partially extends about the rotation axis Cr in the main housing space 37.

The drive unit 50 is an electric actuator for rotationally driving the throttle body 10 via the valve shaft 20. The drive unit 50 includes a drive motor 51, a reduction mechanism 52, and a torsion coil spring 53.

The drive motor 51 shown in FIG. 1 is an electric motor which rotates to both sides around the motor axis Am by energization from an external control circuit. The drive motor 51 has a motor shaft 510 made of metal to generate a drive force by rotation.

The reduction mechanism 52 shown in FIGS. 1 and 2 has plural gears 520, 521, 522, 523 made of resin and connected with each other. The reduction mechanism 52 exhibits a rotational speed reduction function between the first gear 520 and the last gear 523. The first gear 520 is integrally rotatably mounted around the motor axis Am with respect to the coaxial motor shaft 510. The last gear 523 is integrally fixed to the coaxial valve shaft 20 around the rotation axis Cr, and is thus integrally rotatable with the throttle body 10. The driving force (hereinafter simply referred to as "driving force") input from the drive motor 51 to the first gear 520 is amplified by the rotational speed reduction function and transmitted from the last gear 523 to the valve shaft 20. By receiving such a transmission drive force from the valve shaft 20, the throttle body 10 is rotated to a side corresponding to the drive force among both sides around the rotation axis Cr.

The last gear 523 includes a rotating body 525 and a guide body 526. A meshing portion 527 and a movable engagement portion 528 are integrally provided in the generally cylindrical rotating body 525. The meshing portion 527 is formed in the shape of a partial spur gear that partially extends around the rotation axis Cr in the main housing space 37. The meshing portion 527 meshes with the gear 522 on the front side of the last gear 523.

The movable engagement portion 528 is formed in a substantially arc piece shape that partially extends around the rotation axis Cr in the main housing space 37. In the present embodiment, the movable engagement portion 528 is disposed closer to the rotation axis Cr than the fixed engagement portion 330, that is, shifted radially inward of the fixed engagement portion 330.

The rotational position of the rotating body 525 shown in FIGS. 1 and 2 is preset to a default position Ld where the fluid passage 2 is slightly opened from the fully closed state by the throttle body 10. At this default position Ld, the rotating body 525 is at a fixed position due to the loss of the driving force.

Figure 3:
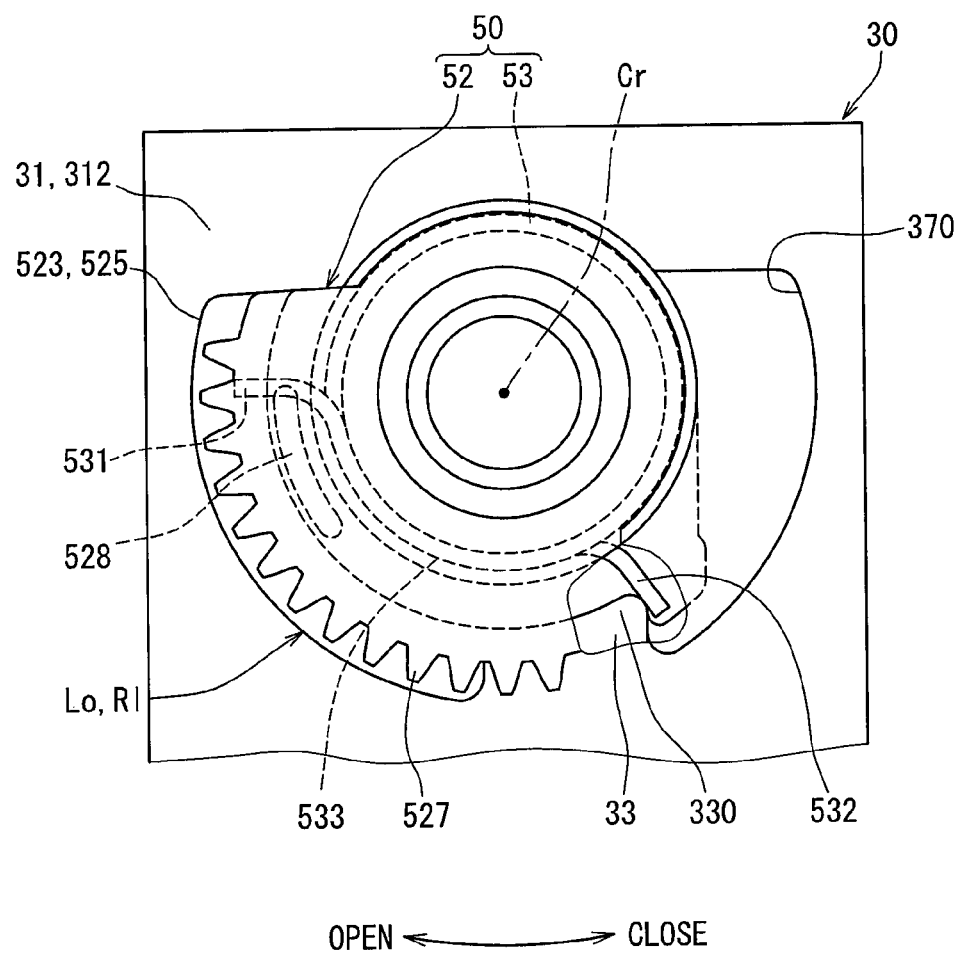
FIG. 3 is a cross-sectional view corresponding to FIG. 2 and illustrating an operating state different from that of FIG. 2.

The fluid passage 2 is fully opened by the throttle body 10 when the rotating body 525 is located at the rotational position shown in FIG. 3, ie, which is previously set to the fully open position Lo where the fluid passage 2 has the maximum opening degree on product specifications. At the fully open position Lo, the meshing portion 527 is engaged with the second housing portion 312 from the opposite side to the default position Ld, whereby the rotating body 525 is restricted from rotating to the open side (hereinafter simply referred to as "open side") to open the fluid passage 2 in the rotational direction. Therefore, a large rotation area Rl is defined on the open side of the default position Ld, where the rotating body 525 is rotationally driven by the generation of the driving force up to the fully open position Lo.

Figure 4:
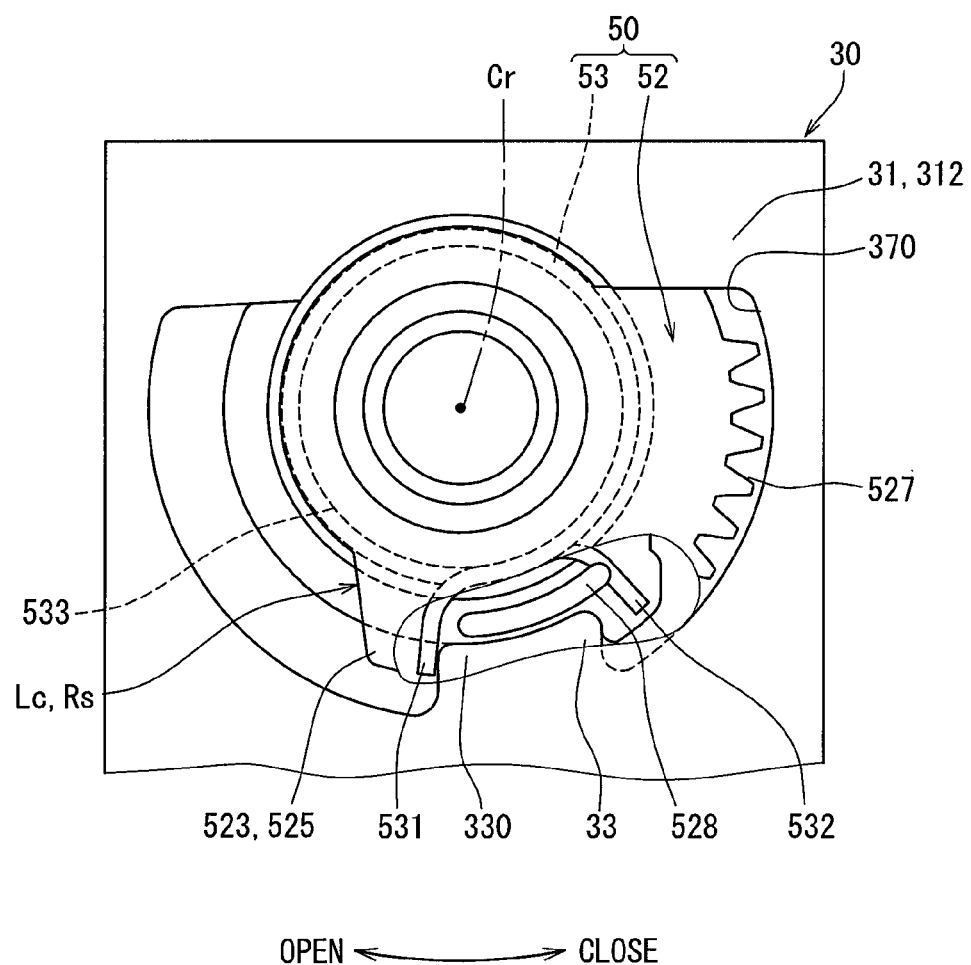
FIG. 4 is a cross-sectional view corresponding to FIG. 2 and illustrating an operating state different from that of FIGS. 2 and 3.

The rotational position of the rotating body 525 shown in FIG. 4 is preset to the fully closed position Lc where the fluid passage 2 is fully closed by the throttle body 10. In the fully closed position Lc, the second housing portion 312 locks the meshing portion 527 from the side opposite to both of the fully opened position Lo and the default position Ld, thereby restricting the rotation to the closing side to close the fluid passage 2 in the rotational direction (hereinafter referred to simply as the "closed side") relative to the rotating body 525. Therefore, the rotation area in which the rotating body 525 is rotationally driven by the driving force to the fully closed position Lc is defined as the small rotation area Rs, on the closed side of the default position Ld. The permitted rotation angle is smaller in the small rotation area than in the large rotation area Rl.

As shown in FIG. 1, the guide body 526 is formed in a cylindrical shape having an outer peripheral surface continuous around the rotation axis Cr in the main housing space 37. The guide body 526 is coaxially and integrally formed with the meshing portion 527 of the rotating body 525. The guide body 526 is able to coaxially and integrally mounted on the valve shaft 20.

The torsion coil spring 53 shown in FIGS. 1 and 2 is a torsion spring that is elastically deformable by torsion to generate a restoring force (hereinafter referred to as "torsion elastic force"). The torsion coil spring 53 is formed by winding a metal wire. The torsion coil spring 53 is disposed around the guide body 526. The torsion coil spring 53 has a coil portion 533 between the hook portions 531 and 532 at both ends.

The hook portions 531 and 532 are formed in a hook shape bent or curved radially outward from the coil portion 533, respectively. The hook portions 531 and 532 both extend to the outer side in the radial direction than the movable engagement portion 528 and the fixed engagement portion 330. The first hook portion 531 is disposed closer to the meshing portion 527 than the second hook portion 532 in the axial direction along the rotation axis Cr, around the guide body 526.

In the default position Ld of FIGS. 1 and 2, the first hook portion 531 engages with the movable engagement portion 528 that is at least one of the engagement portions 330 and 528 from the open side. At the same time, in the default position Ld, the second hook portion 532 engages with the movable engagement portion 528 which is at least one of the engagement portions 330 and 528 from the closing side. In these engaged states, the hook portions 531 and 532 apply torsional elastic forces to the opposite sides from each other with respect to the same engagement target, so that the rotating body 525 is maintained at the default position Ld since the driving force disappears. Even in the state, the torsion coil spring 53 is elastically deformed due to the torsion, and the hook portions 531 and 532 receive the reaction force from the engagement portions 330 and 528.

On the other hand, the first hook portion 531 is engaged with the movable engagement portion 528 from the open side that becomes one of the engagement portions 330 and 528 in the large rotation area Rl including the fully open position Lo of FIG. 3 as the rotation area shifted to the open side from the default position Ld. At the same time, in the large rotation area Rl, the second hook portion 532 engages with the fixed engagement portion 330, which is the other of the engagement portions 330 and 528, from the closing side. In these engaged states, the first hook portion 531 applies a torsional elastic force toward the closing side to the movable engagement portion 528 to be engaged, such that the rotating body 525 rotates to a position where the torsional elastic force and the drive force are balanced in the large rotation area RI.

On the other hand, in the small rotation area Rs including the fully closed position Lc of FIG. 4 as the rotation area shifted from the default position Ld to the closing side, the first hook portion 531 is engaged with the engagement portion 330 from the open side. At the same time, in the small rotation area Rs, the second hook portion 532 engages with the movable engagement portion 528 which is the other of the engagement portions 330 and 528 from the closing side. In these engaged states, the second hook portion 532 gives a torsional elastic force to the movable engagement portion 528 to be engaged toward the open side, thereby the rotating body 525 rotates to a position where the torsional elastic force and the driving force are balanced in the small rotation region Rs.

As shown in FIGS. 1 and 2, the coil portion 533 is formed in a coil shape (i.e., a spiral shape) that leaves a gap between metal wires. The coil portion 533 is guided by the guide body 526 from the inner side in the radial direction. The diameter of the coil portion 533 from the coil axis Cc is substantially constant between both ends.

As shown in FIG. 1, the sensor unit 70 is configured by combining a rotor magnet 71 and a sensor element 72. The rotor magnet 71 is a permanent magnet that constantly forms a magnetic field. The rotor magnet 71 is embedded in the rotating body 525 so as to be integrally rotatable. The sensor element 72 is a magnetoelectric conversion element that detects a magnetic field and outputs a detection signal, such as a Hall element. The sensor element 72 is embedded in the body cover 32. The sensor element 72 is disposed on the inner side of the rotating body 525 and the guide body 526 in the radial direction in the main housing space 37. Thus, the detection signal output from the sensor element 72 represents the rotational position of the rotating body 525 according to the opening degree of the fluid passage 2 opened and closed by the throttle body 10. Therefore, the external control circuit can obtain the opening degree of the fluid passage 2 according to the rotational position of the rotating body 525 based on the detection signal output from the sensor element 72.

A posture correction structure is described. The posture of the coil portion 533 tends to be affected by the reaction force applied to the first hook portion 531 and the second hook portion 532 from the engagement portions 330 and 528. For the purpose of correcting the posture, as shown in FIGS. 5-8, the movable engagement portion 528 has a first groove 528a in which the first hook portion 531 is fitted and engaged and a second groove 528b in which the second hook portion 532 is fitted and engaged.

The first groove 528a has a shape opening on the side of the first hook portion 531 (see FIG. 5) and extends in the circumferential direction of the coil portion 533 (see FIG. 6) in which the wire of the first hook portion 531 extends. A portion of the movable engagement portion 528 forming the first groove 528a corresponds to the first pressing portion 81. The first pressing portion 81 has an engagement surface 811, a pressing surface 812 and an opposing surface 813.

The engagement surface 811 is a flat surface extending perpendicularly to the tangent of the outer periphery of the coil portion 533. The pressing surface 812 and the opposing surface 813 are flat surfaces extending perpendicularly to the engagement surface 811. The pressing surface 812 is located adjacent to the last gear 523 in the coil axial direction Cc, and the opposing surface 813 is located between the pressing surface 812 and the center M of the coil portion 533 (see FIGS. 5 and 6) in the coil axial direction Cc. Further, the pressing surface 812 of the first hook portion 531 has a tapered shape which is inclined in a direction approaching the center M as separating from the radial center of the coil portion 533 (see FIGS. 7 and 8).

An end face of the coil portion 533 adjacent to the meshing portion 527 in the coil axial direction Cc is referred to as a first end surface 535a (see FIG. 6), and an end face of the coil portion 533 adjacent to the throttle body 10 is referred to as a second end surface 536a. The distance from the first end surface 535a to the center M in the coil axial direction Cc is equal to the distance from the second end surface 536a to the center M.

The second groove 528b has the same shape as the first groove 528a, and a portion of the movable engagement portion 528 forming the second groove 528b corresponds to the second pressing portion 82. The second pressing portion 82 has an engagement surface 821, a pressing surface 822 and an opposing surface 823. The pressing surface 822 is located on the side of the center M in the coil axial direction Cc, and the opposing surface 823 is located adjacent to the throttle body 10 in the coil axial direction Cc. Further, the pressing surface 822 of the second hook portion 532 has a tapered shape which is inclined in a direction approaching the center M as separating from the center of the coil portion 533 in the radial direction.

Figure 6:
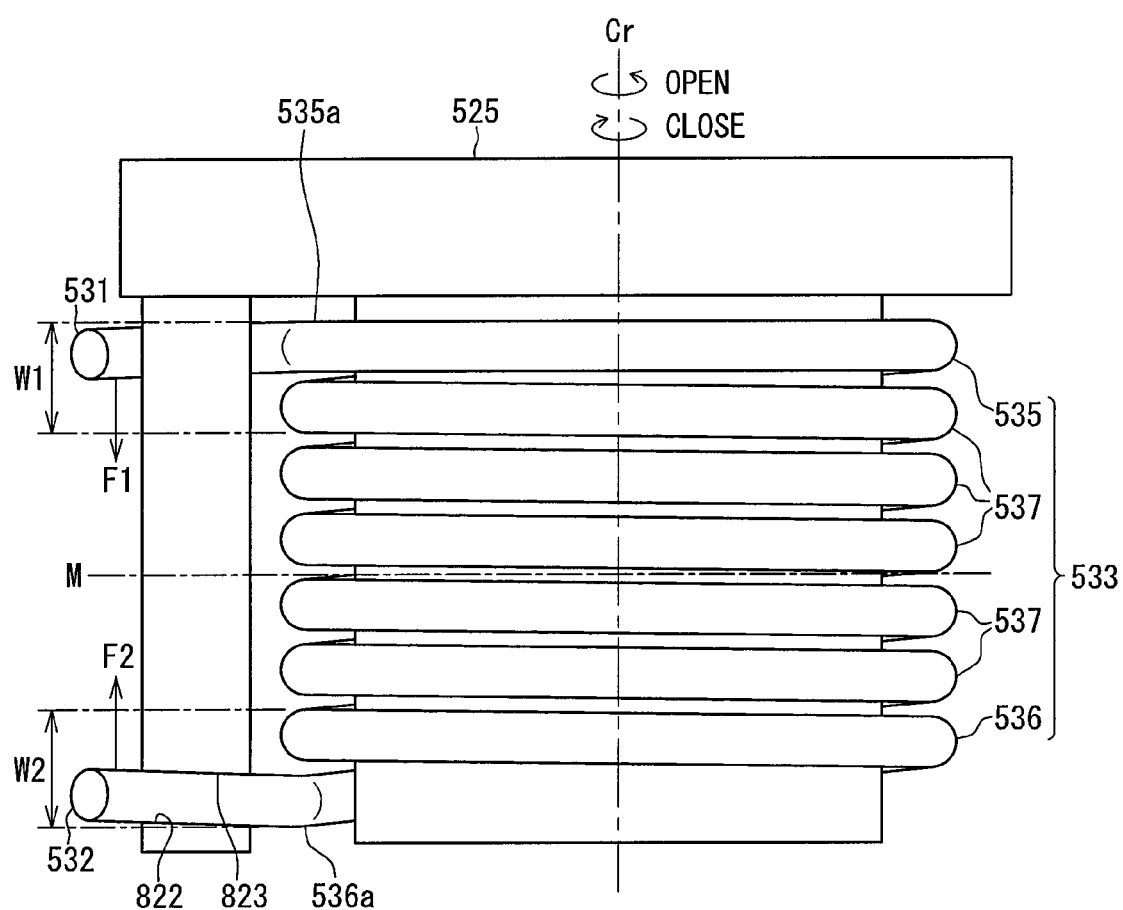
FIG. 6 is a view seen in an arrow direction VI of FIG. 5.

As shown in FIG. 6, the pressing surface 812 of the first hook portion 531 is located closer to the center M than the first end surface 535a in the coil axial direction Cc, and the pressing surface 822 of the second hook portion 532 is located closer to the center M than the second end surface 536a in the coil axial direction Cc.

Further, in the coil axial direction Cc, a region where the first turn portion 535 adjacent to the meshing portion 527 is located is referred to as a first region W1, and a region where the first turn portion 536 adjacent to the throttle body 10 is located is referred to as a second region W2. The entire of the first pressing portion 81 in the coil axial direction Cc is disposed in the first region W1, and the entire of the second pressing portion 82 in the coil axial direction Cc is disposed in the second region W2.

Figure 7:
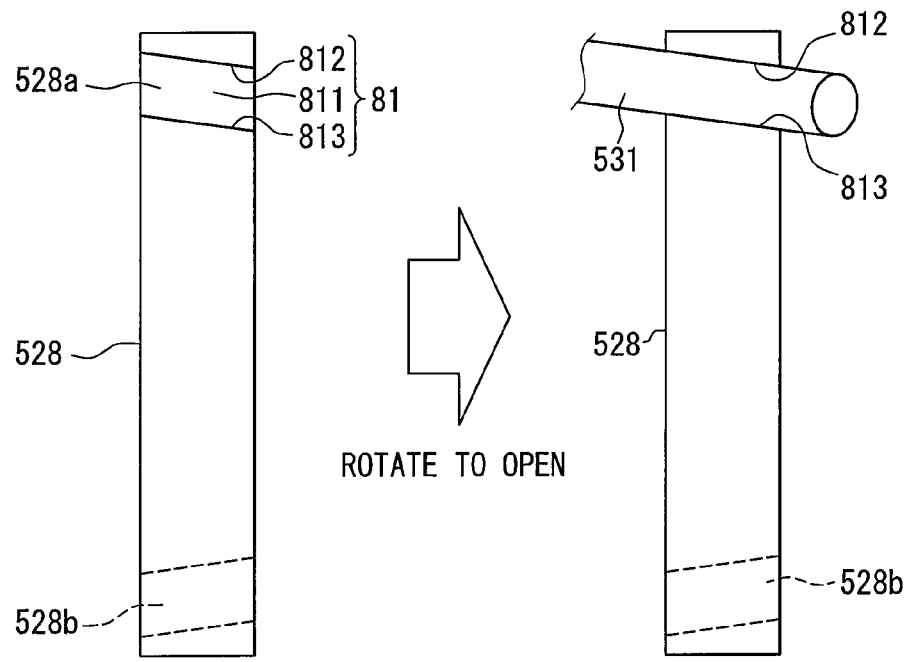
FIG. 7 is a view illustrating a groove shape of a movable engagement portion as viewed in an arrow direction VII of FIG. 5.

As shown in the right side of FIG. 7, when the rotating body 525 is at the default position or rotates to the open side from the default position, the side surface of the first hook portion 531 fits into the first groove 528a, and the engagement surface 811 receives torsional elastic force from the first hook portion 531. In other words, the first hook portion 531 receives a reaction force against the torsional elastic force from the engagement surface 811. On the other hand, as shown in the left side of FIG. 7, when the rotating body 525 rotates to the closing side from the default position, the first hook portion 531 is disengaged from the first groove 528a.

Figure 8:
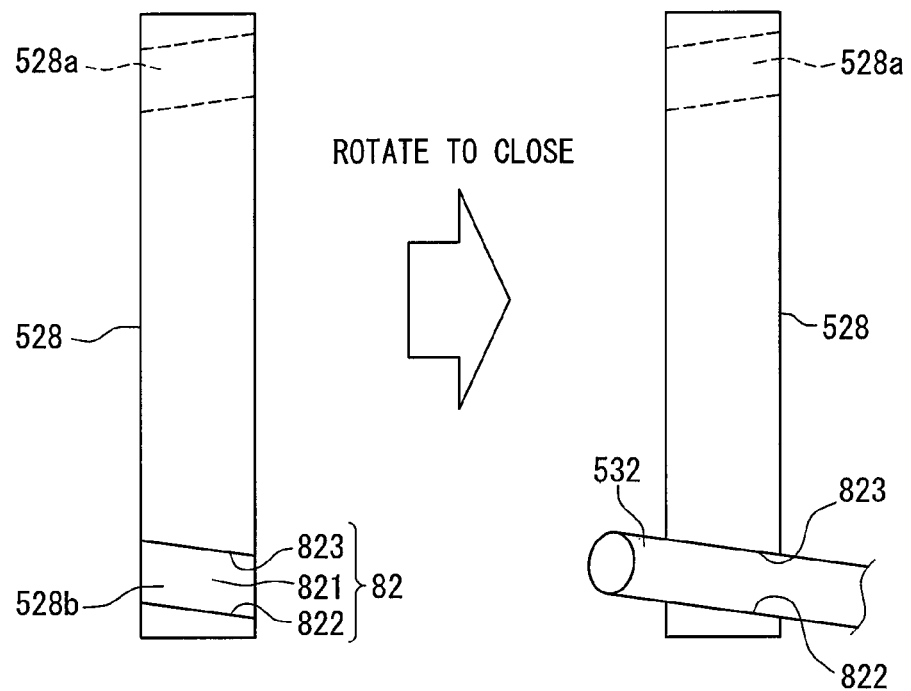
FIG. 8 is a view illustrating a groove shape of a movable engagement portion as view in the arrow direction VI of FIG. 5.

As shown in the right side of FIG. 8, when the rotating body 525 is at the default position or rotates to the closing side from the default position, the side surface of the second hook portion 532 fits into the second groove 528b, and the engagement surface 821 receives torsional elastic force from the second hook portion 532. In other words, the second hook portion 532 receives a reaction force against the torsional elastic force from the engagement surface 821.

In short, when the rotating body 525 is rotating from the default position to one side, the first pressing portion 81 presses the first hook portion 531, and the second hook portion 532 separates from the second pressing portion 82. When rotating to the other side, the second pressing portion 82 presses the second hook portion 532, and the first hook portion 531 separates from the first pressing portion 81.

Next, a comparative example will be described with reference to FIGS. 9 and 10, in which the grooves 528a and 528b are not formed contrary to the present embodiment. The posture of the coil portion 533 is affected when the grooves 528a and 528b are not formed.

Figure 9:
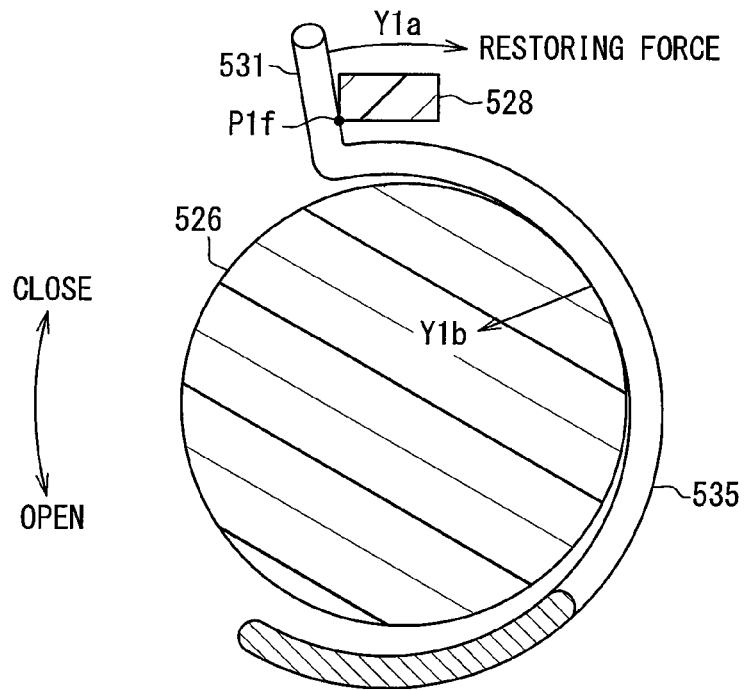
FIG. 9 is a cross-sectional view taken along a line IX-IX of FIG. 5.

As shown in FIG. 9, when the rotating body 525 is at rest in the default position, the first hook portion 531 tries to rotate clockwise (closing side) in an arrow direction Y1a by the restoring force of the torsion coil spring 53. However, the first hook portion 531 cannot rotate by engaging the movable engagement portion 528. Therefore, the action force by the restoring force acts on the first turn portion 535 as shown by the arrow direction Y1b while the engagement point P1f between the movable engagement portion 528 and the first hook portion 531 corresponds to a fulcrum. As a result, a portion of the first turn portion 535 located on the opposite side of the movable engagement portion 528 with respect to the first hook portion 531 is pressed against the guide body 526.

In the state where the first turn portion 535 is acted on in this manner, when the rotating body 525 stands still at the default position or rotates to the open side, the engagement point P1f with the movable engagement portion 528 is the fulcrum. When the rotating body 525 rotates to the closing side, an engagement point with the fixed engagement portion 330 is generated as a fulcrum. In short, when the first hook portion 531 receives a reaction force from the target engagement portion, the position of the coil axis Cc is deviated toward the first hook portion 531 than the target engagement portion with respect to the rotation axis Cr, in a portion of the coil portion 533 adjacent to the meshing portion 527.

Figure 10:
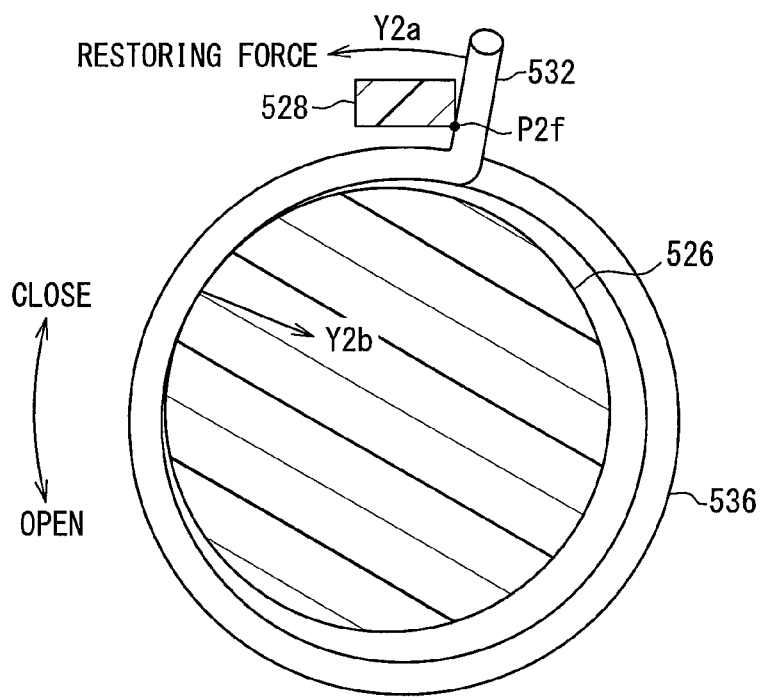
FIG. 10 is a cross-sectional view taken along a line XX in FIG. 5.

As shown in FIG. 10, when the rotating body 525 is at rest in the default position, the second hook portion 532 tries to rotate counterclockwise (open side) in the arrow direction Y2a by the restoring force of the torsion coil spring 53. However, the second hook portion 532 cannot rotate by engaging the movable engagement portion 528. Therefore, the action force by the restoring force acts on the first turn portion 536 as shown by the arrow direction Y2b while the engagement point P2f between the movable engagement portion 528 and the second hook portion 532 corresponds to a fulcrum. As a result, a portion of the first turn portion 536 located opposite to the movable engagement portion 528 with respect to the second hook portion 532 is pressed against the guide body 526.

In this state where an acting force is applied to the first turn portion 536, when the rotating body 525 is stopped at the default position or rotated to the closing side, the engagement point P2f with the movable engagement portion 528 is the fulcrum. When the rotating body 525 rotates to the open side, an engagement point with the fixed engagement portion 330 is generated as a fulcrum. In short, when the second hook portion 532 receives a reaction force from the target engagement portion, the position of the coil axis Cc is deviated toward the second hook portion 532 than the target engagement portion with respect to the rotation axis Cr, in a portion of the coil portion 533 adjacent to the throttle body 10.

Figure 5:
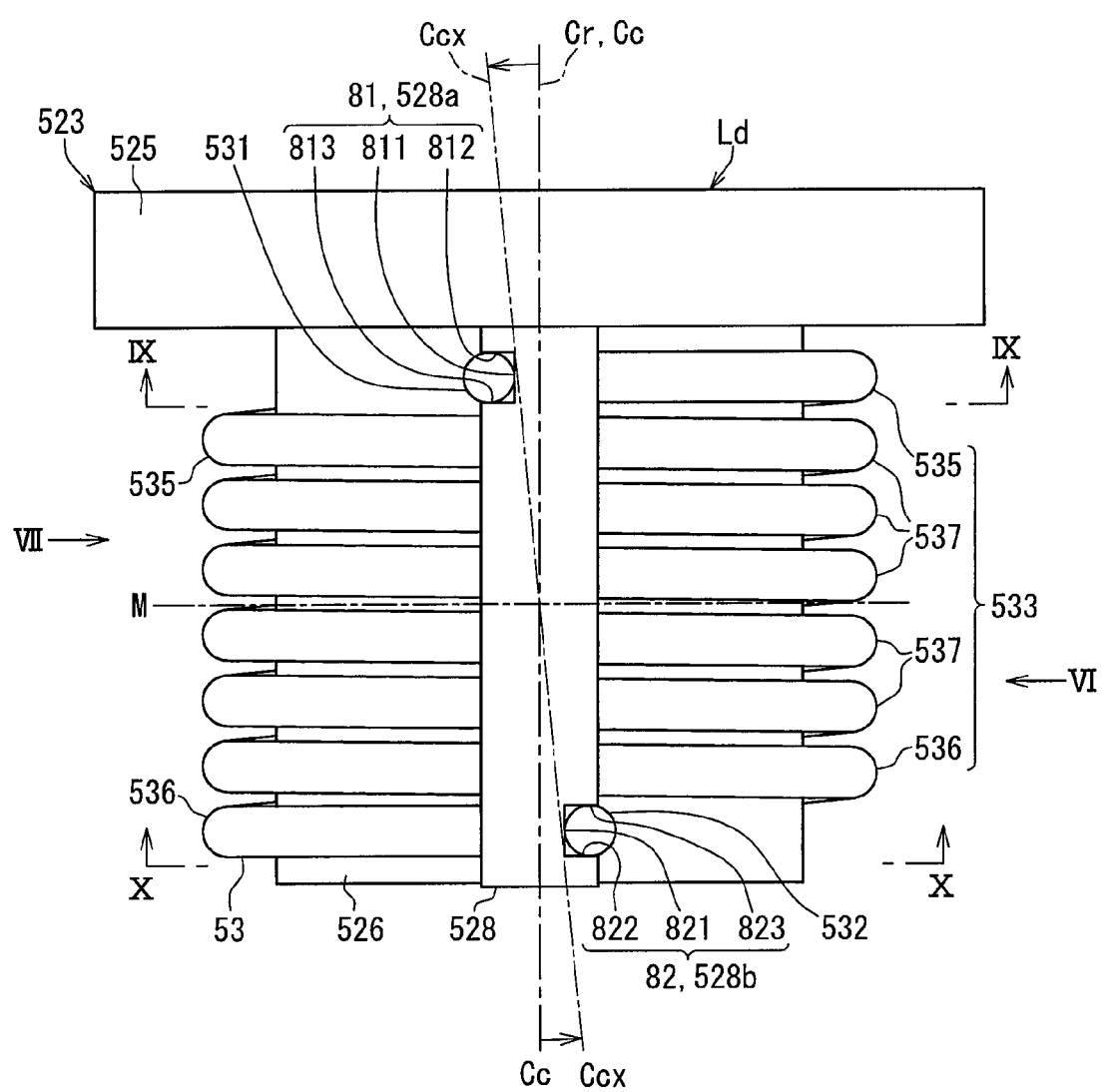
FIG. 5 is a front view schematically illustrating a drive unit according to the first embodiment.

As described above, the posture of the coil portion 533 is affected since the coil portion 533 receives forces in different directions at a portion adjacent to the meshing portion 527 and a portion adjacent to the throttle body 10. First, the coil axis Cc does not become straight. Further, although the coil axis Ccx in the above-described example looks straight when viewed from the extending direction of the first hook portion 531 and the second hook portion 532, as shown in FIG. 5, the coil axis Ccx tilts with respect to the rotation axis Cr. Further, the coil portion 533 in the above-described example is deformed as follows. That is, a portion of the coil portion 533 adjacent to the hook portions 531 and 532 in the circumferential direction is deformed in the arrow direction Fx in FIG. 11 so as to be stretched in the coil axial direction Cc. On the other hand, a portion of the coil portion 533 on the side opposite from the hook portions in the circumferential direction is deformed in the arrow direction Fy in FIG. 11 so as to be compressed in the coil axial direction Cc.

Then, the inventor found that the posture of the coil portion 533 can be corrected by reducing the deformation in the tensile direction Fx and the deformation in the compressive direction Fy. The correction of the posture referred to here is correction in which the coil axis Cc is made close to a straight line and correction to suppress the inclination of the coil axis Cc with respect to the rotation axis Cr.

Figure 11:
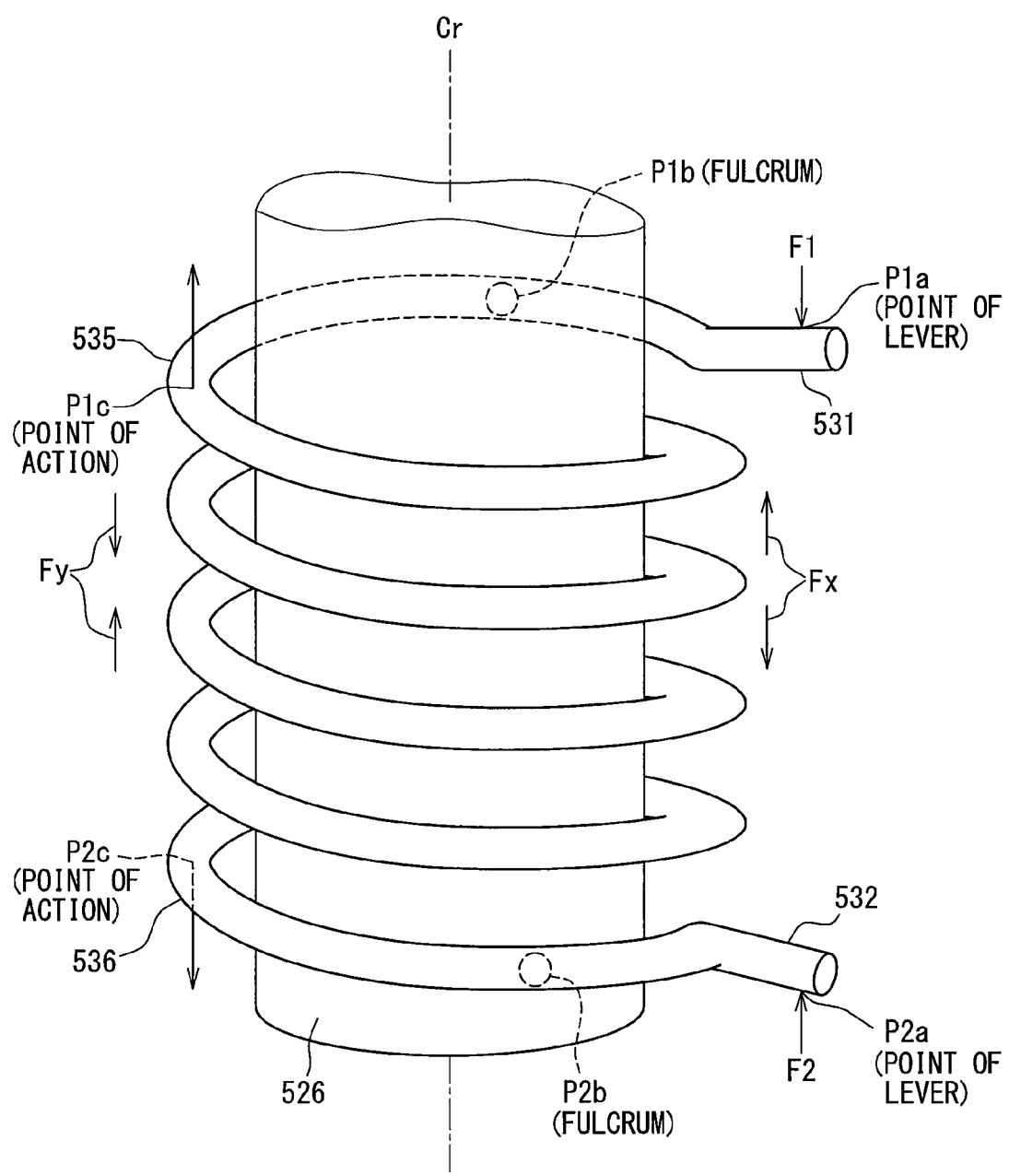
FIG. 11 is a perspective view of a torsion coil spring and a guide body according to the first embodiment.

Then, as shown in FIG. 11, when the pressing force F1 is applied to the first hook portion 531 toward the center M in the coil axial direction Cc, the action force by the pressing force F1 acts on the action point P1c of the coil portion 533 while the contact portion P1b between the first turn portion 535 and the guide body 526 works as a fulcrum. Similarly, when a pressing force F2 is applied to the second hook portion 532 toward the center M in the coil axial direction Cc, the acting force by the pressing force F2 acts on the action point P2c of the coil portion 533 while the contact portion P2b between the first turn portion 536 and the guide body 526 works as a fulcrum. The inventors have found that these action points P1c and P2c act on a portion of the coil portion 533 on the side opposite from the hook portions in the circumferential direction, in the above-described deformation region in the compression direction. This means that the posture of the coil portion 533 can be corrected by applying the pressing forces F1, F2 to the hook portions 531, 532 toward the center M in the coil axial direction Cc.

Accordingly, in the throttle valve device 1 according to the present embodiment, the pressing surfaces 812 and 822 are configured to press the hook portions 531 and 532 to apply the pressing force toward the center M in the coil axial direction Cc. Therefore, when the hook portions 531 and 532 receive a reaction force from the engagement surfaces 811 and 821, a portion of the coil portion 533 opposite from the hook portion is deformed in the compression direction, but the deformation is relieved by the pressing forces F1 and F2 acting on the action points P1c and P2c while the contact portion P1b, P2b works as a fulcrum. Thus, the posture of the coil portion 533 can be corrected.

Further, in the above-described conventional structure, it is required to press the coil portion 533 from the radially outer side at an optimum angle with high accuracy. In contrast, in the structure of the present embodiment, the direction of the pressing forces F1 and F2 applied to the hook portions 531 and 532 by the pressing surfaces 812 and 822 can be inclined with respect to the rotation axis Cr and the coil axis Cc. Even if the pressing direction is inclined, a component of the force in the coil axial direction Cc acts as the pressing forces F1 and F2, and the posture can be corrected. Therefore, according to the present embodiment in which the pressing forces F1 and F2 are applied toward the center M in the coil axial direction Cc, the required accuracy in the pressing direction is lower than in the conventional structure pressing from the radially outer side. As a result, the posture can be easily corrected.

In addition, when the posture of the coil portion 533 is changed, the friction between the coil portion 533 and the guide body 526 is increased, and there is a concern that the guide body 526 is worn. In addition, when the posture of the coil portion 533 is changed, there is no gap between the metal wires of the torsion coil spring 53, and there is a concern that the wires may be rubbed and worn. If these frictions become large, the driving torque required for the drive motor 51 will become large. In addition, since a force by the drive motor 51, a recovery force by the torsion coil spring 53, and a frictional force with the guide body 526 are applied to the rotating body 525, the torque required for the rotation of the rotating body 525 has a hysteresis in the range from the default position Ld to the fully closed position Lc or from the default position Ld to the fully opened position Lo. There is a concern that the hysteresis is increased as the wear is larger. Therefore, when the posture of the coil portion 533 is corrected by the present embodiment, these concerns can be reduced.

Furthermore, in the present embodiment, the pressing portion 81 applies the pressing force F1 to the first hook portion 531 and the pressing portion 82 applies the pressing force F2 to the second hook portion 532. Therefore, since the pressing forces F1 and F2 contributing to the posture correction are applied from both of the hook portions 531 and 532, the certainty of the posture correction can be improved as compared with the case of applying from either one.

Furthermore, in the present embodiment, the first pressing portion 81 and the second pressing portion 82 are provided in the movable engagement portion 528. When the rotating body 525 is rotating from the default position to one side, the first pressing portion 81 presses the first hook portion 531, and the second hook portion 532 separates from the second pressing portion 82. Conversely, when the rotating body 525 is rotating from the default position to the other side, the second pressing portion 82 presses the second hook portion 532, and the first hook portion 531 separates from the first pressing portion 81. In the present embodiment, the first pressing portion 81 and the second pressing portion 82 are provided. Therefore, even if one of the two hook portions 531 and 532 moves away from the movable engagement portion 528, at least one of the two pressing portions 81 and 82 applies a pressing force. Thus, the pressing force can be always applied.

Furthermore, in the present embodiment, the movable engagement portion 528 includes the first groove 528a in which the first hook portion 531 is fitted and engaged, and the second groove 528b in which the second hook portion 532 is engaged and engaged. Further, the pressing surface 812, 822 of the pressing portion 81, 82 which presses the hook portion 531, 532 is formed on the inner wall surface of the groove 528a, 528b. Therefore, since the hook portion 531, 532 is fitted with the groove 528a, 528b for the engagement and the application of the pressing force, a part of the movable engagement portion 528 can be used as the pressing portion 81, 82, so that the valve device 1 can be downsized.

Furthermore, in the present embodiment, the pressing surface 812 of the first pressing portion 81 pressing against the first hook portion 531 is closer to the center M of the coil portion 533 in the coil axial direction Cc than the end surface 535a of the coil portion 533 adjacent to the meshing portion 527. Further, the pressing surface 822 of the second pressing portion 82 pressing against the second hook portion 532 is located closer to the center M of the coil portion 533 in the coil axial direction Cc than the end surface 535b of the coil portion 533 adjacent to the throttle body 10. Accordingly, the pressing direction of the pressing portion 81, 82 pressing against the hook portion 531, 532 can be accurately set toward the center M, such that the pressing force F1, F2 can be easily obtained.

Furthermore, in the present embodiment, at least a portion of the first pressing portion 81 is disposed in the first region W1 in which the first turn portion 535 is located in the coil axial direction Cc. Further, at least a portion of the second pressing portion 82 is disposed in the second region W2 in which the first turn portion 536 is located in the coil axial direction Cc. Therefore, the pressing direction of the pressing portion 81, 82 pressing against the hook portion 531, 532 can be precisely set toward the center M, such that the pressing force F1, F2 can be easily obtained.

Furthermore, in the present embodiment, the pressing surface 812, 822 of the pressing portion 81, 82 has a tapered shape that is inclined to approach the center M as the distance from the radial center of the coil portion 533 increases. Therefore, as shown in FIG. 11, when rotating the first turn portion 535, 536 in a direction opposite to the arrow direction Fy while the contact portion P1b, P2b between the coil portion 533 and the guide body 526 works as a fulcrum, the pressing portion 81, 82 can be pressed in the rotating direction. Therefore, it is possible to certainly restrict the deformation of the portion of the coil portion 533 opposite from the hook portion in the compression direction.

Figure 12:
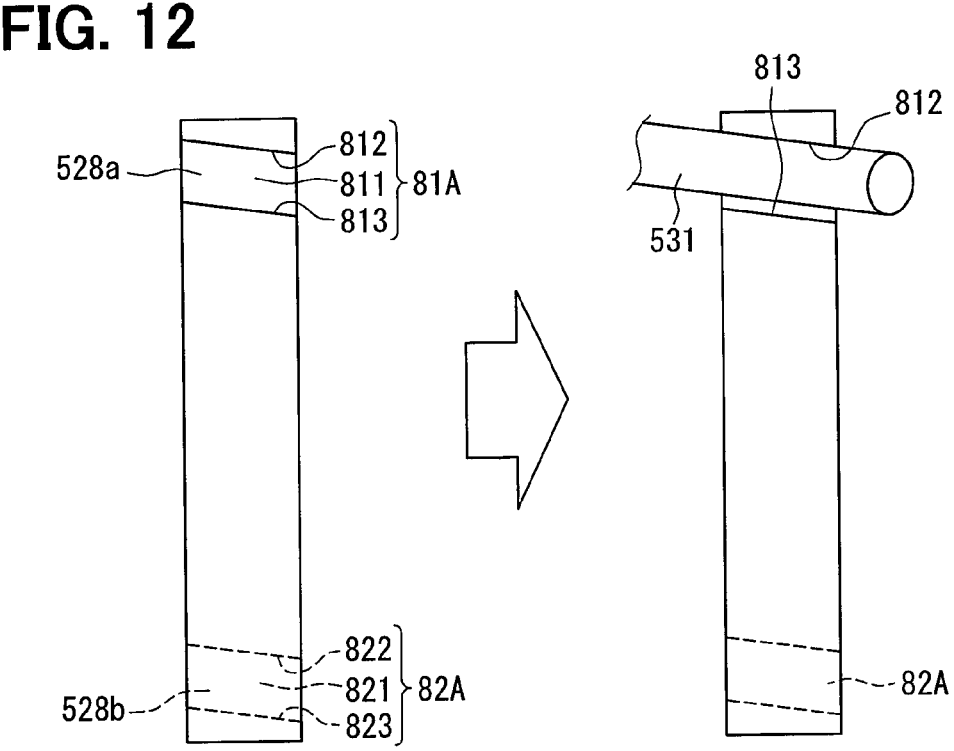
FIG. 12 is a view illustrating a groove shape of a movable engagement portion according to a first modification of the first embodiment.

A first modification of the first embodiment will be described. As shown in FIGS. 7 and 8, in the first embodiment, both of the pressing surface 812, 822 and the opposing surface 813, 823 are in contact with the outer peripheral surface of the hook portion 531, 532 in the state where the hook portion 531, 532 is fitted in the groove 528a, 528b. That is, the width of the groove 528a, 528b is the same as the diameter of the metal wire. In contrast, as shown in FIG. 12, the width of the groove 528a, 528b may be set larger than the diameter of the metal wire as in the pressing portion 81A, 82A. In this case, the pressing force F1, F2 is applied to the hook portion 531, 532 by the pressing surface 812, 822 in contact with the hook portion 531, 532.

Figure 13:
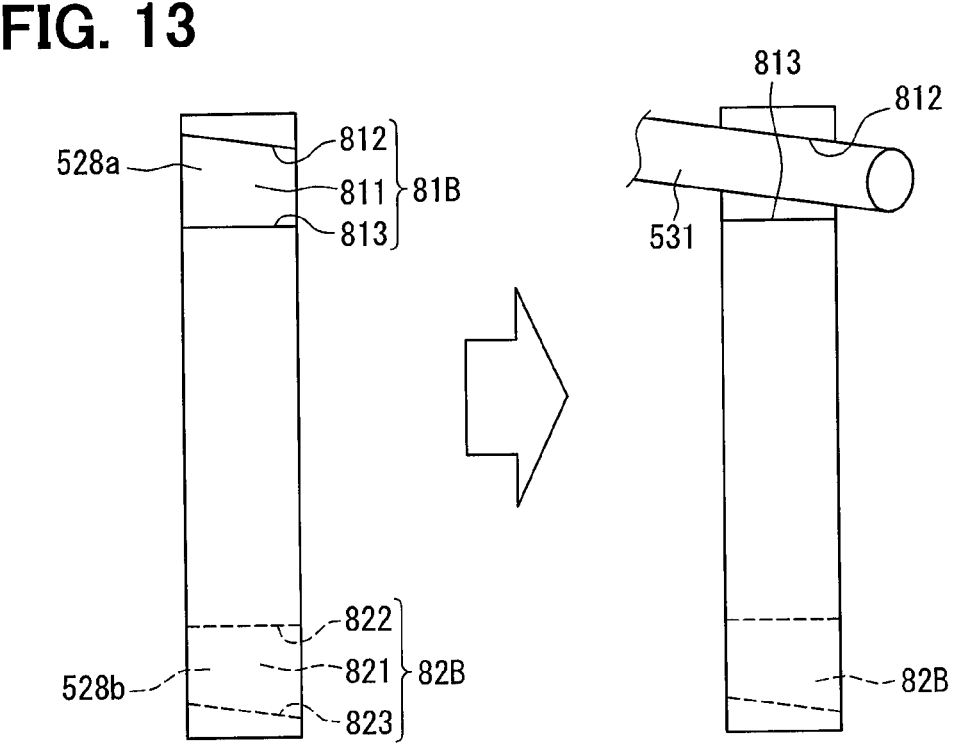
FIG. 13 is a view illustrating a groove shape of a movable engagement portion according to a second modification of the first embodiment.

A second modification of the first embodiment will be described. In the first embodiment shown in FIGS. 7 and 8, both of the pressing surface 812, 822 and the opposing surface 813, 823 are formed in a tapered shape. Alternatively, as in the pressing portion 81B, 82B shown in FIG. 13, while the pressing surface 812, 822 is formed in a tapered shape, the opposing surface 813, 823 is formed in a non-tapered shape extending perpendicularly to the coil axis Cc.

Figure 14:
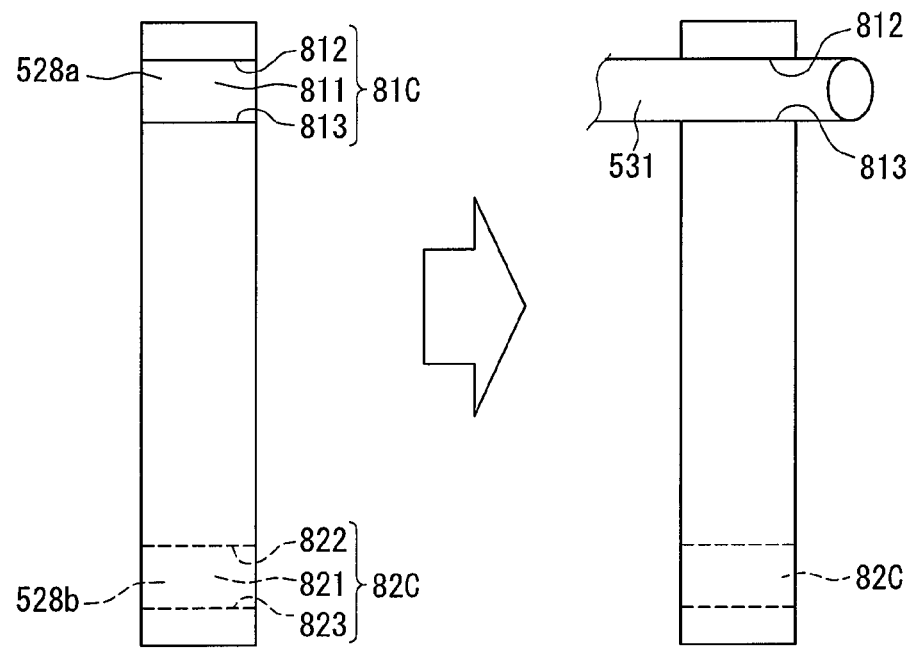
FIG. 14 is a view illustrating a groove shape of a movable engagement portion according to a third modification of the first embodiment.

A third modification of the first embodiment will be described. In the first embodiment shown in FIGS. 7 and 8, both of the pressing surface 812, 822 and the opposing surface 813, 823 are formed in a tapered shape. Alternatively, as in the pressing portion 81C, 82C shown in FIG. 14, both the pressing surface 812, 822 and the opposing surface 813, 823 have a non-tapered shape extending perpendicularly to the coil axis Cc.

Figure 15:
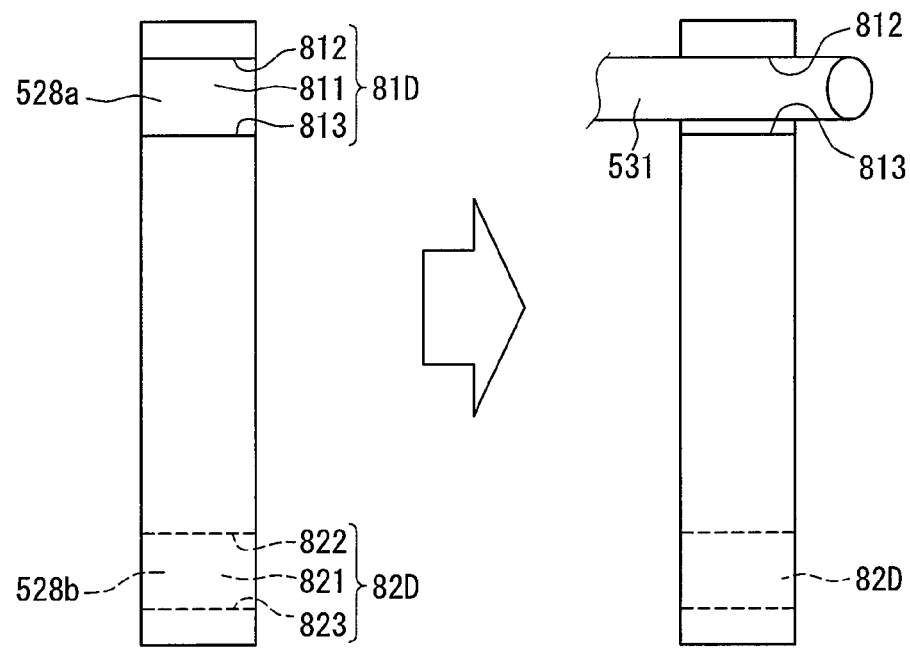
FIG. 15 is a view illustrating a groove shape of a movable engagement portion according to a fourth modification of the first embodiment.

A fourth modification of the first embodiment will be described. In the third modification shown in FIG. 14, both of the pressing surface 812, 822 and the opposing surface 813, 823 are in contact with the outer peripheral surface of the hook portion 531, 532 in the state where the hook portion 531, 532 is fitted in the groove 528a, 528b. That is, the width of the groove 528a, 528b is the same as the diameter of the metal wire. Alternatively, as shown in FIG. 15, both the pressing surface 812, 822 and the opposing surface 813, 823 are non-tapered as in the pressing portion 81D, 82D and the width of the groove 528a, 528b is set larger than the diameter of the metal wire.

Figure 16:
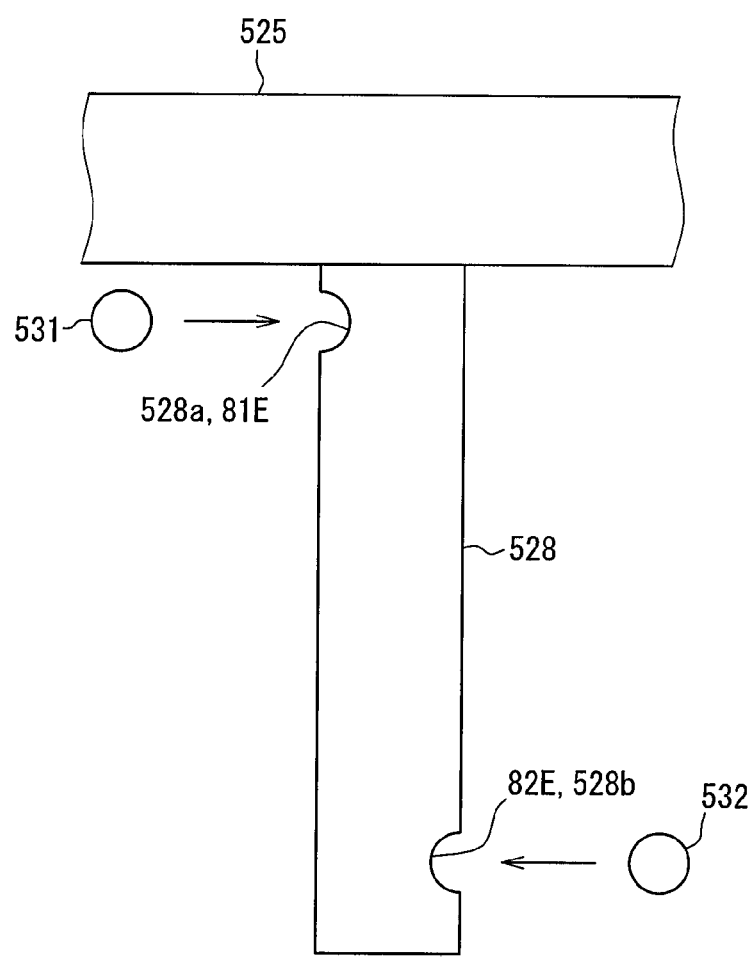
FIG. 16 is a view illustrating a groove shape of a movable engagement portion according to a fifth modification of the first embodiment.

A fifth modification of the first embodiment will be described. As shown in FIG. 5, in the first embodiment, the pressing surface 812, 822 and the opposing surface 813, 823 are disposed at right angles to each other, and the groove 528a, 528b is square in the cross section. Alternatively, the groove 528a, 528b has a circular arc shape in the cross section as in the pressing portion 81E, 82E shown in FIG. 16. In other words, the groove 528a, 528b has a cross-sectional shape in which the opening area gradually increases as the hook portion 531, 532 moves away from the groove 528a, 528b in response to rotation of the rotating body 525.

Accordingly, the hook portion 531, 532 can smoothly fit in the groove 528a, 528b when the hook portion 531, 532 fits in or comes out of the groove 528a, 528b in response to the rotation of the rotating body 525.

Figure 17:
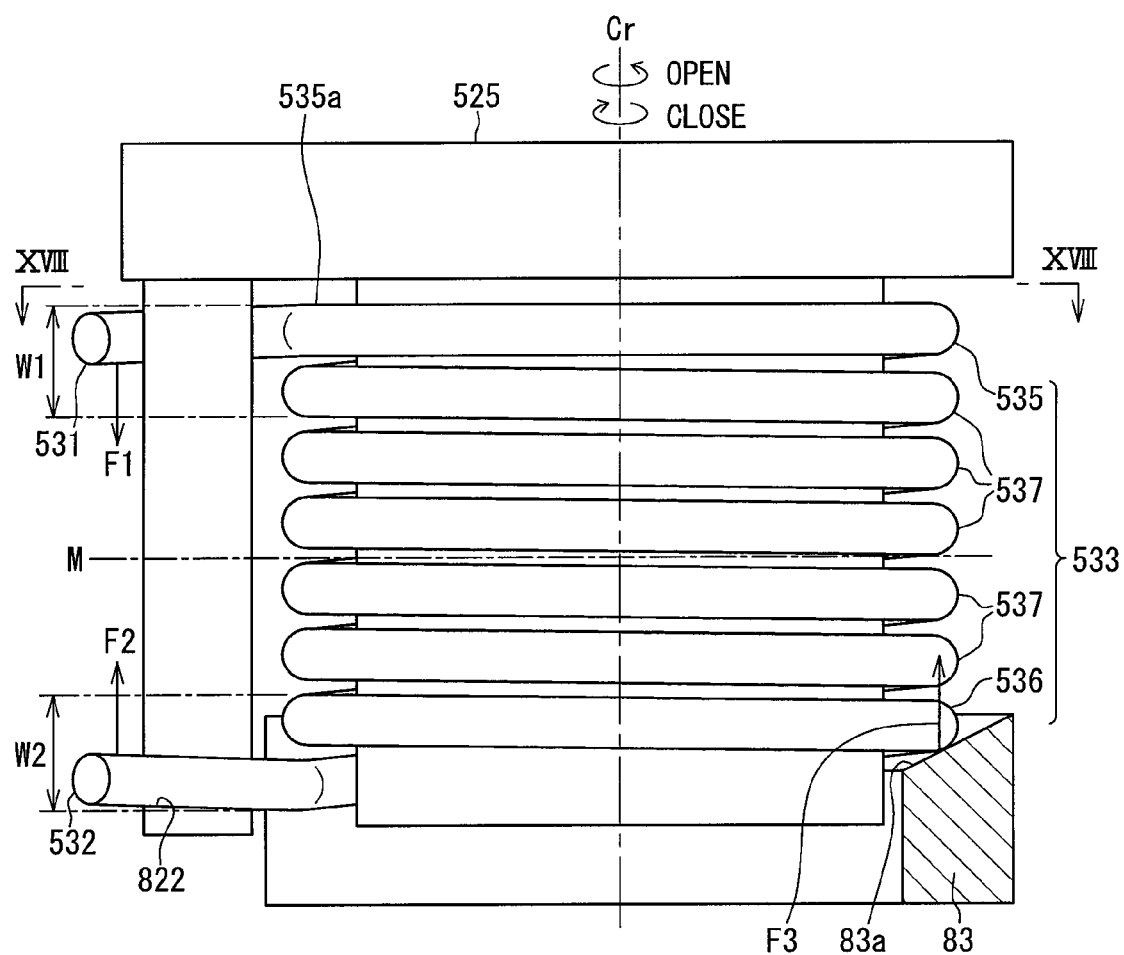
FIG. 17 is a view illustrating a groove shape of a movable engagement portion according to a sixth modification of the first embodiment.
Figure 18:
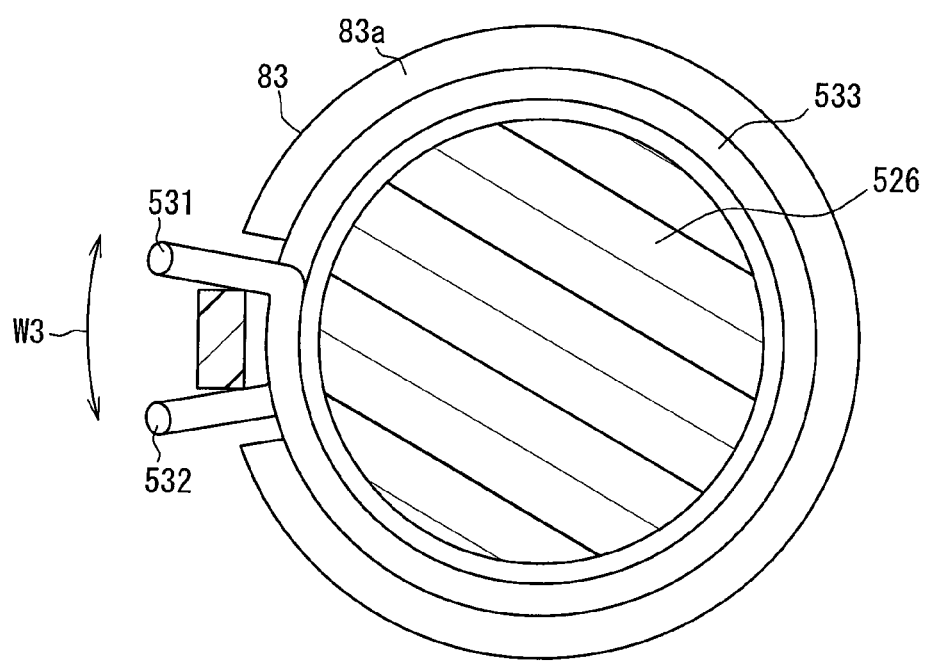
FIG. 18 is a cross-sectional view taken along a line XVIII-XVIII in FIG. 17.

A sixth modification of the first embodiment will be described. In this modification shown in FIGS. 17 and 18, a push portion 83 is provided to push a part of the coil portion 533 toward the center M in the coil axial direction Cc, compared with the configuration of the first embodiment. The push portion 83 is disposed in the rotation area of the hook portion 531, 532. The reference symbol W3 in the drawing indicates a region other than the rotation area of the hook portion 531, 532. In the present modification, the push portion 83 is provided over the entire rotation area of the hook portion 531, 532. In short, the pushing force F3 is applied to the first turn portion 536 adjacent to the throttle body 10 in a region out of the rotation region where the pressing surface 822 applies the pressing force F2. The pushing force F3 is applied toward the center M in the coil axial direction Cc.

The push portion 83 is attached to and supported by the body part 31 shown in FIG. 1. The push portion 83 has a tapered surface 83a in contact with the first turn portion 536 adjacent to the throttle body 10. The tapered surface 83a is shaped so as to be inclined toward the throttle body 10 as approaching the coil axis Cc in the radial direction.

As described above, according to the present modification, the pushing force F3 is also applied to the coil portion 533 in addition to the pressing forces F1 and F2, so that the posture correction of the coil portion 533 can be promoted.

Second Embodiment

Figure 19:
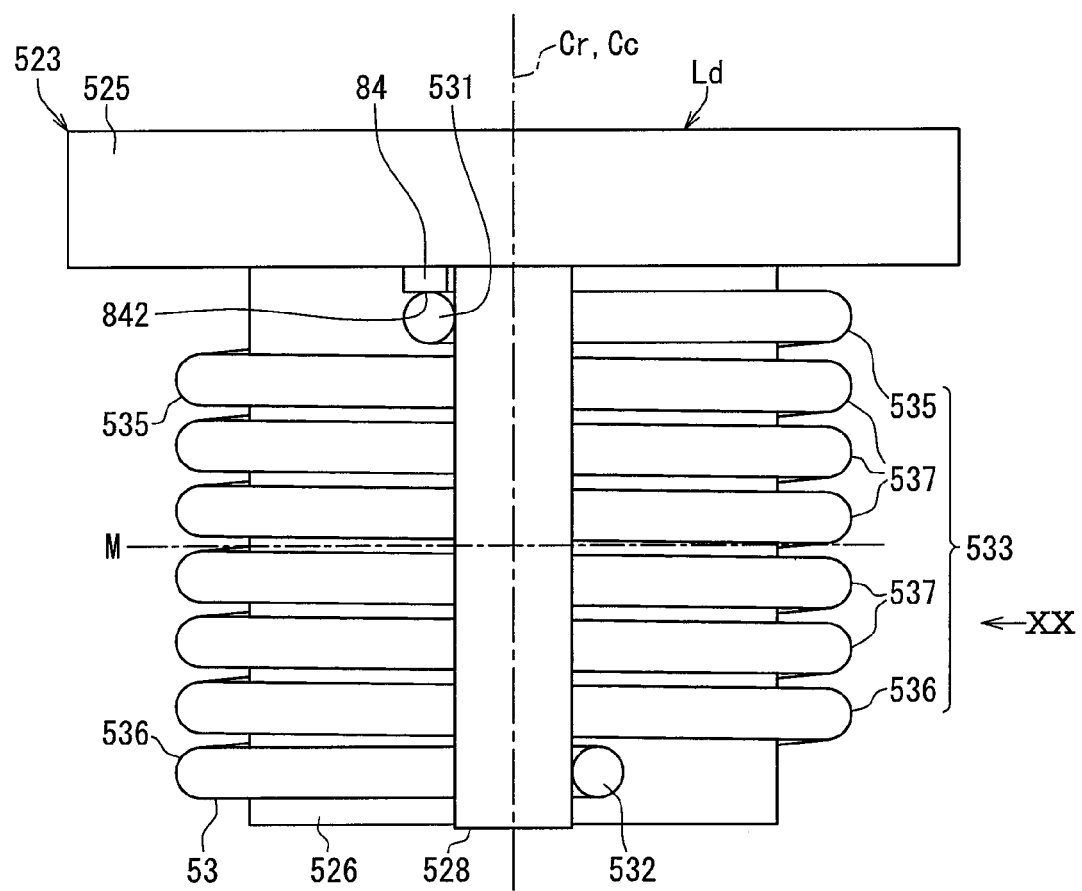
FIG. 19 is a front view schematically illustrating a drive unit according to a second embodiment.
Figure 20:
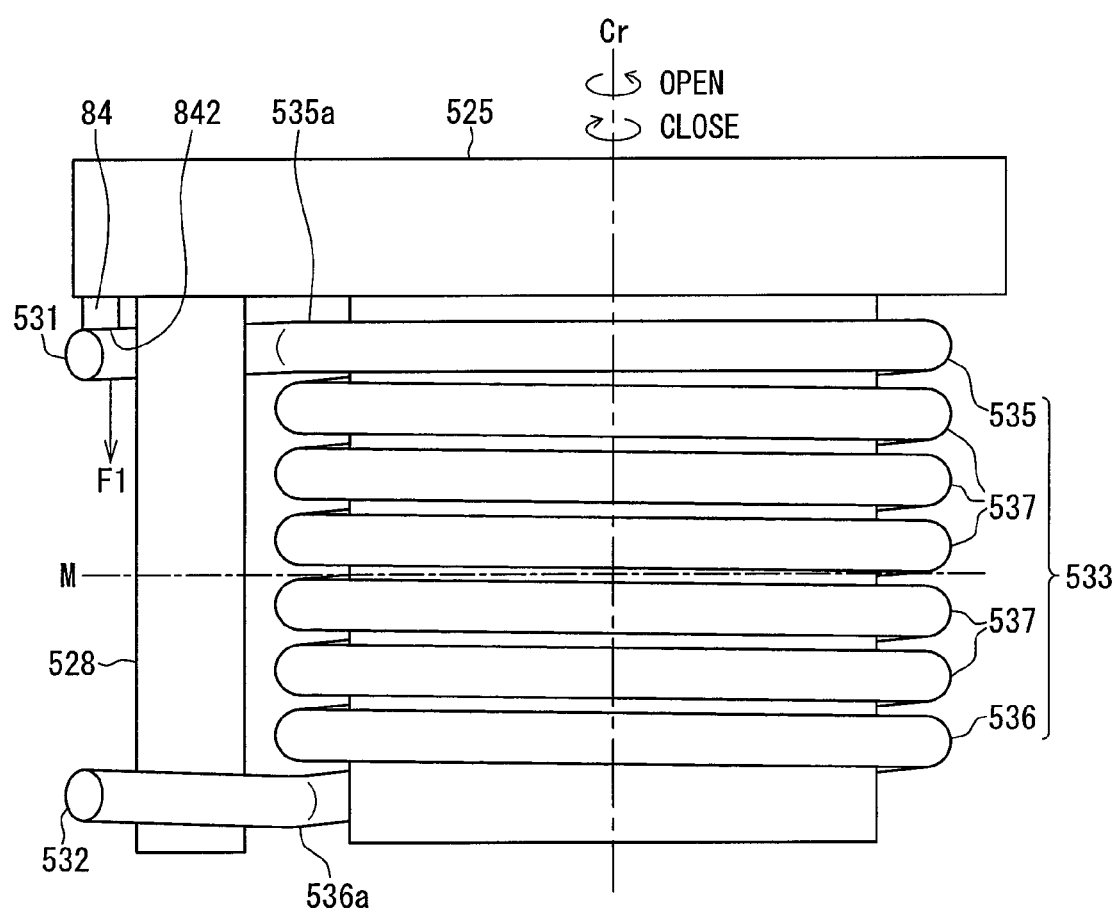
FIG. 20 is a view seen in an arrow direction XX of FIG. 19.

In the first embodiment, the movable engagement portion 528 is made to function as the pressing portion 81, 82 by forming the groove 528a, 528b having the pressing surface 812, 822 in the movable engagement portion 528. In contrast, in the present embodiment, as shown in FIGS. 19 and 20, the grooves 528a and 528b are eliminated, and a protruding pressing portion 84 is provided on the rotating body 525. Specifically, the rotating body 525 and the pressing portion 84 are integrally molded using resin. The pressing portion 84 has a pressing surface 842 pressing the first hook portion 531. The pressing surface 842 applies the pressing force F1 to the first hook portion 531 in the same manner as the pressing surface 812 of the first pressing portion 81.

Therefore, when the hook portions 531 and 532 receive a reaction force from the engagement surfaces 811 and 821, the coil portion 533 is deformed in the compression direction on the side opposite from the hook portions, and the deformation is relieved by the pressing force F1 acting on the action point P1c while the contact portion P1b works as a fulcrum. Therefore, the posture of the coil portion 533 can be corrected also in the present embodiment in which the groove 528a is replaced with the pressing portion 84. Furthermore, in the present embodiment, the pressing surface 842 of the pressing portion 84 pressing the first hook portion 531 is positioned between the center M of the coil portion 533 and the end surface 535a of the coil portion 533 adjacent to the meshing portion 527 in the coil axial direction Cc. Accordingly, the pressing direction in which the pressing portion 84 presses the first hook portion 531 can be accurately set toward the center M, and the pressing force F1 can be easily obtained. Furthermore, in the present embodiment, at least a portion of the pressing portion 84 is disposed in the first region W1 in which the first turn portion 535 is located in the coil axial direction Cc. Therefore, the pressing direction in which the pressing portion 84 presses the first hook portion 531 can be precisely set toward the center M, and the pressing force F1 can be easily obtained.

A first modification of the second embodiment will be described. In the second embodiment, as shown in FIG. 19, when the first hook portion 531 is engaged with the movable engagement portion 528, the pressing portion 84 is pressed against the first hook portion 531 to apply the pressing force F1. However, when the first hook portion 531 is engaged with the fixed engagement portion 330, the pressing portion 84 is separated from the first hook portion 531 and does not apply the pressing force F1. That is, the pressing portion 84 is disposed not entirely in the rotation area of the first hook portion 531.

Figure 21:
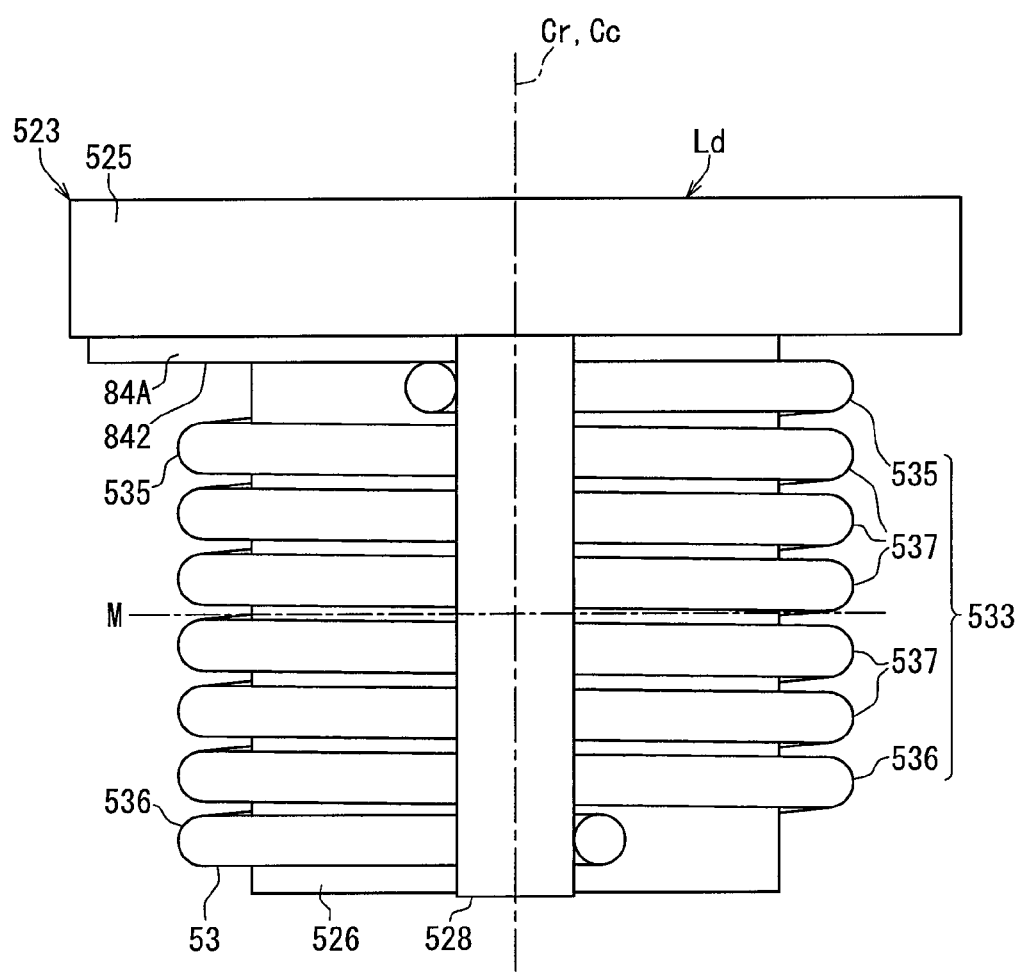
FIG. 21 is a front view schematically illustrating a drive unit according to a first modification of the second embodiment.

As shown in FIG. 21, the pressing portion 84A may be disposed in the entire rotation area of the first hook portion 531. Accordingly, even when the first hook portion 531 is engaged with the fixed engagement portion 330, the pressing portion 84 can contact the first hook portion 531 and can apply the pressing force F1. Therefore, the effect of correcting the posture of the coil portion 533 can be improved.

Figure 22:
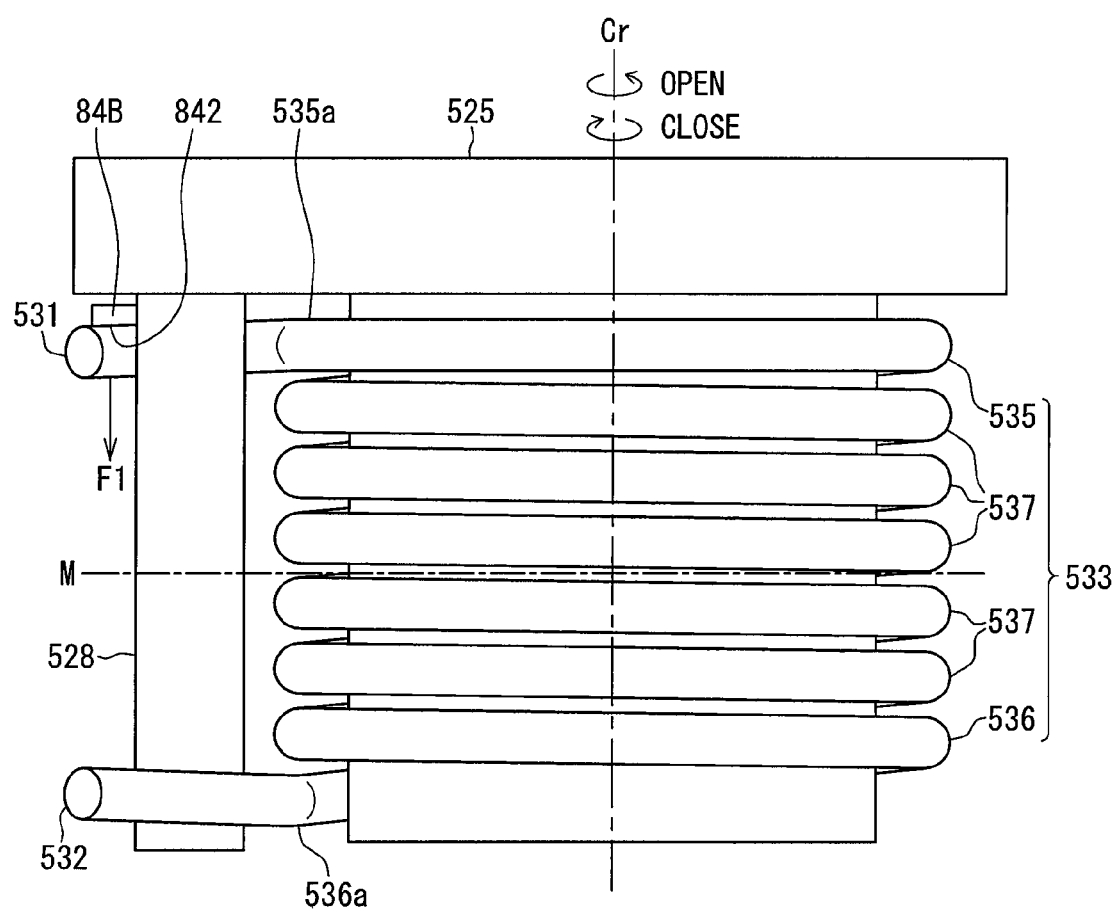
FIG. 22 is a side view schematically illustrating a drive unit according to a second modification of the second embodiment.

A second modification of the second embodiment will be described. In the second embodiment, the pressing portion 84 is provided on the rotating body 525, and the pressing portion 84 has a shape projecting in the coil axial direction Cc. Alternatively, as shown in FIG. 22, the movable engagement portion 528 may be provided with a pressing portion 84B. The pressing portion 84B in this case has a shape protruding in the radial direction of the coil portion 533.

Another modifications of the above embodiment will be described. Although multiple embodiments have been described above, the present disclosure is not construed as being limited to these embodiments, and can be applied to various embodiments and combinations within a scope that does not depart from the gist of the present disclosure.

In the embodiments, the movable engagement portion 528 is made to function as the pressing portion 81, 82 by forming the groove 528a, 528b in the movable engagement portion 528. Alternatively, a part of the fixed engagement portion 330 may be functioned as a pressing portion by forming a groove in the fixed engagement portion 330. Alternatively, grooves may be formed in both the movable engagement portion 528 and the fixed engagement portion 330, and both the movable engagement portion 528 and the fixed engagement portion 330 may function as a pressing portion.

In the embodiments, although both the first hook portion 531 and the second hook portion 532 are engaged with one movable engagement portion 528, the first hook portion 531 and the second hook portion 532 may be separately engaged with different movable engagement portions.

In the embodiments, the entirety of the pressing portion 81 is disposed in the first region W1, and the entirety of the pressing portion 82 is disposed in the second region W2. However, a part of the pressing portion 81, 82 may be arranged out of the region W1, W2 while at least a part of the pressing portion 81, 82 is disposed in the region W1, W2.

The pressing portion 84 shown in FIGS. 19 and 20 is disposed at a position away from the movable engagement portion 528, and is disposed to press the tip end of the first hook portion 531. Alternatively, the pressing portion 84 may be disposed adjacent to the movable engagement portion 528 to press a position away from the tip end of the first hook portion 531.

In the embodiments, the guide body 526 is integrally molded with the rotating body 525 so that the guide body 526 rotates integrally with the rotating body 525. However, the guide body 526 may be formed separate from the rotating body 525.

As a modification of the embodiments, the fixed engagement portion 330 may be disposed radially inward of the movable engagement portion 528. As a modification of the embodiments, in the default position Ld, at least one of the first turn portions 535 and 536 in the coil portion 533 may be engaged with the fixed engagement portion 330 in addition to or instead of the movable engagement portion 528.

As a modification of the embodiments, one of the rotation areas RI and Rs may not be set. When the small rotation area Rs is not set, at the default position Ld, the first hook portion 531 engages with the movable engagement portion 528 and the second hook portion 532 engages with the fixed engagement portion 330. Further, at the default position Ld, when the large rotation area RI is not set, the first hook portion 531 may be engaged with the fixed engagement portion 330 and the second hook portion 532 may be engaged with the movable engagement portion 528.

The present disclosure may be applied to, for example, a throttle valve device or the like having a fluid passage 2 through which exhaust gas of an internal combustion engine flows, as a modification of the embodiments. Here, the exhaust gas recirculation (EGR) device is a throttle valve device having a fluid passage 2 through which exhaust gas flows, or a throttle valve device having a fluid passage 2 through which exhaust gas flows and also intake air flows.

Although the present disclosure has been described in accordance with the examples, it is understood that the present disclosure is not limited to the above examples or structures. The present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure.

What is claimed is:

1. A throttle valve device comprising:
a valve body having a fixed engagement portion and forming a fluid passage;
a throttle body configured to increase or decrease an opening degree of the fluid passage;
a rotating body having a movable engagement portion and integrally rotating with the throttle body;
a torsion coil spring having a coil portion between a first hook portion and a second hook portion; and
a guide body that guides a radially inner side of the coil portion, wherein
when the rotating body is located at a default position due to a disappearance of a driving force, the first hook portion and the second hook portion are engaged with at least one of the fixed engagement portion and the movable engagement portion,
when the rotating body is rotated from the default position by the driving force, the first hook portion is engaged with one of the fixed engagement portion and the movable engagement portion, and the second hook portion is engaged with the other of the fixed engagement portion and the movable engagement portion,
the throttle valve device has a pressing portion configured to press at least one of the first hook portion and the second hook portion to apply a pressing force toward a center of the coil portion in a coil axial direction, and
the pressing portion is formed in a protrusion provided on the rotating body.

2. The throttle valve device according to claim 1, wherein the pressing portion is provided in a range including an entire rotation area of the first hook portion or the second hook portion.

3. A throttle valve device comprising:
a valve body having a fixed engagement portion and forming a fluid passage;
a throttle body configured to increase or decrease an opening degree of the fluid passage;
a rotating body having a movable engagement portion and integrally rotating with the throttle body;
a torsion coil spring having a coil portion between a first hook portion and a second hook portion; and
a guide body that guides a radially inner side of the coil portion, wherein
when the rotating body is located at a default position due to a disappearance of a driving force, the first hook portion and the second hook portion are engaged with at least one of the fixed engagement portion and the movable engagement portion,
when the rotating body is rotated from the default position by the driving force, the first hook portion is engaged with one of the fixed engagement portion and the movable engagement portion, and the second hook portion is engaged with the other of the fixed engagement portion and the movable engagement portion,
the throttle valve device has a pressing portion configured to press at least one of the first hook portion and the second hook portion to apply a pressing force toward a center of the coil portion in a coil axial direction, and
the pressing portion has a pressing surface configured to press the first hook portion or the second hook portion, and the pressing surface is located between the center of the coil portion and an end surface of the coil portion in the coil axial direction.

4. A throttle valve device comprising:
a valve body having a fixed engagement portion and forming a fluid passage;
a throttle body configured to increase or decrease an opening degree of the fluid passage;
a rotating body having a movable engagement portion and integrally rotating with the throttle body;
a torsion coil spring having a coil portion between a first hook portion and a second hook portion; and
a guide body that guides a radially inner side of the coil portion, wherein
when the rotating body is located at a default position due to a disappearance of a driving force, the first hook portion and the second hook portion are engaged with at least one of the fixed engagement portion and the movable engagement portion,
when the rotating body is rotated from the default position by the driving force, the first hook portion is engaged with one of the fixed engagement portion and the movable engagement portion, and the second hook portion is engaged with the other of the fixed engagement portion and the movable engagement portion, the throttle valve device has a pressing portion configured to press at least one of the first hook portion and the second hook portion to apply a pressing force toward a center of the coil portion in a coil axial direction, at least one of the movable engagement portion or the fixed engagement portion has a groove in which the first hook portion or the second hook portion is fitted and engaged, and the pressing portion has a pressing surface configured to press the first hook portion or the second hook portion, and the pressing surface is formed by an inner wall surface of the groove.

5. The throttle valve device according to claim 4, wherein the groove has a cross-sectional shape in which an opening area gradually increases as the first hook portion or the second hook portion moves away from the groove in response to rotation of the rotating body.

6. A throttle valve device comprising:
a valve body having a fixed engagement portion and forming a fluid passage;
a throttle body configured to increase or decrease an opening degree of the fluid passage;
a rotating body having a movable engagement portion and integrally rotating with the throttle body;
a torsion coil spring having a coil portion between a first hook portion and a second hook portion; and
a guide body that guides a radially inner side of the coil portion, wherein
when the rotating body is located at a default position due to a disappearance of a driving force, the first hook portion and the second hook portion are engaged with at least one of the fixed engagement portion and the movable engagement portion,
when the rotating body is rotated from the default position by the driving force, the first hook portion is engaged with one of the fixed engagement portion and the movable engagement portion, and the second hook portion is engaged with the other of the fixed engagement portion and the movable engagement portion,
the throttle valve device has a pressing portion configured to press at least one of the first hook portion and the second hook portion to apply a pressing force toward a center of the coil portion in a coil axial direction,
the pressing portion has
a first pressing portion that applies the pressing force to the first hook portion, and
a second pressing portion that applies the pressing force to the second hook portion,
the first pressing portion and the second pressing portion are provided on the movable engagement portion or the fixed engagement portion,
when the rotating body is rotating from the default position to one side, the first pressing portion is pressed against the first hook portion and the second hook portion is separated from the second pressing portion, and
when the rotating body is rotating from the default position to the other side, the second pressing portion is pressed against the second hook portion and the first hook portion is separated from the first pressing portion.

7. The throttle valve device according to claim 6, wherein at least a part of the pressing portion is disposed in a region where the first turn portion of the coil portion is located in the coil axial direction.

8. The throttle valve device according to claim 6, wherein the pressing portion has a pressing surface configured to press the first hook portion or the second hook portion, and the pressing surface is shaped in a taper inclined toward the center of the coil portion as going away from a center of the coil portion in a radial direction.

9. The throttle valve device according to claim 6, further comprising: a push portion disposed in a rotation area of the first hook portion or the second hook portion to push a part of the coil portion toward the center of the coil portion in the coil axial direction.

* * * * *